United States Patent
Stewart et al.

(10) Patent No.: US 10,554,049 B2
(45) Date of Patent: Feb. 4, 2020

(54) REAL-TIME DISAGGREGATION OF RENEWABLE ENERGY GENERATION ON AN ELECTRICITY DISTRIBUTION SYSTEM

(71) Applicant: The Regents of The University of California, Oakland, CA (US)

(72) Inventors: Emma Mary Stewart, Danville, CA (US); Ciaran Martin Roberts, Berkeley, CA (US); Emre can Kara, San Mateo, CA (US); Michaelangelo David Tabone, Kensington, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 348 days.

(21) Appl. No.: 15/463,749

(22) Filed: Mar. 20, 2017

(65) Prior Publication Data
US 2017/0271877 A1 Sep. 21, 2017

Related U.S. Application Data

(60) Provisional application No. 62/311,319, filed on Mar. 21, 2016.

(51) Int. Cl.
*H02J 3/38* (2006.01)
*G05B 15/02* (2006.01)
*H02J 13/00* (2006.01)

(52) U.S. Cl.
CPC .......... *H02J 3/383* (2013.01); *H02J 13/0006* (2013.01); *H02J 3/386* (2013.01)

(58) Field of Classification Search
CPC ...... H02J 3/383; H02J 13/0006; G05B 15/02; Y02E 60/723; Y04S 10/16; Y04S 10/123
See application file for complete search history.

(56) References Cited

U.S. PATENT DOCUMENTS

| | | | |
|---|---|---|---|
| 9,581,618 B1* | 2/2017 | McEachern | G01R 31/02 |
| 2012/0290168 A1 | 11/2012 | De et al. | |
| 2013/0073105 A1* | 3/2013 | Schmid | H02J 3/382 |
| | | | 700/295 |

OTHER PUBLICATIONS

D. Macii, G. Barchi, and D. Moser, "Impact of pmus on state estimation accuracy in active distribution grids with large pv penetration," in *Environmental, Energy and Structural Monitoring Systems (EESMS)*, 2015 IEEE Workshop on, pp. 72-77, IEEE, (Jul. 9-10, 2015).
A. von Meier, D. Culler, A. McEachern, and R. Arghandeh, "Microsynchrophasors for distribution systems," in *IEEE 5th Innovative Smart Grid Technologies Conference*, Washington, DC, (Feb. 19-22, 2014).
(Continued)

*Primary Examiner* — Regis J Betsch
*Assistant Examiner* — Jeremy A Delozier
(74) *Attorney, Agent, or Firm* — Weaver Austin Villeneuve & Sampson LLP

(57) ABSTRACT

Techniques are described for disaggregation of renewable energy generation on an electricity distribution system. Aggregate power measurements are identified a distribution substation. Active power load of the distribution substation and active power generated by renewable energy sites can be disaggregated from the aggregate power measurements.

20 Claims, 17 Drawing Sheets

(56) References Cited

OTHER PUBLICATIONS

J. Sexauer, P. Javanbakht, and S. Mohagheghi, "Phasor measurement units for the distribution grid: Necessity and benefits," in *Innovative Smart Grid Technologies (ISGT), 2013 IEEE PES*, pp. 1-6, IEEE, (Feb. 24-27, 2013).

"μpmu information." http://www.powersensorsltd.com/PQube3.php. Accessed, (Jan. 15, 2016).

J. H. Eto, E. M. Stewart, T. Smith, M. Buckner, H. Kirkham, F. Tuffner, and D. Schoenwald, "Scoping study on research and priorities for distribution-system phasor measurement units," (Dec. 2015).

M. Wytock and J. Z. Kolter, "Contextually supervised source separation with application to energy disaggregation," arXiv preprint arXiv: 1312.5023, (Dec. 18, 2013).

C. A. Gueymard, "Direct and indirect uncertainties in the prediction of tilted irradiance for solar engineering applications," *Solar Energy*, vol. 83, No. 3, pp. 432-444, (Mar. 2009).

C. A. Gueymard, "Progress in direct irradiance modeling and validation," in *Solar 2010 Conf.*, Phoenix, AZ, American Solar Energy Soc, (May 19, 2010).

J. Alonso-Montesinos, F. Batlles, and J. Bosch, "Beam, diffuse and global solar irradiance estimation with satellite imagery," *Energy Conversion and Management*, vol. 105, pp. 1205-1212, (Nov. 15, 2015).

M. Jamaly, J. L. Bosch, and J. Kleissl, "Aggregate ramp rates of distributed photovoltaic systems in san diego county," *Sustainable Energy, IEEE Transactions on*, vol. 4, No. 2, pp. 519-526, (Apr. 2013).

F. A. Mejia and J. Kleissl, "Soiling losses for solar photovoltaic systems in California," *Solar Energy*, vol. 95, pp. 357-363, (Sep. 2013).

D. C. Jordan and S. R. Kurtz, "Photovoltaic degradation rates—an analytical review," *Progress in photovoltaics: Research and Applications*, vol. 21, No. 1, pp. 12-29, (Jan. 1, 2013).

Taylor, Z., Akhavan-Hejazi, H., Cortez, E., Alvarez, L., Ula, S., Barth, M., & Mohsenian-Rad, H., "Battery-assisted distribution feeder peak load reduction: Stochastic optimization and utility-scale implementation," in *Power & Energy Society General Meeting, 2016 IEEE*, IEEE, (Jul. 17, 2016).

R. Haaren, M. Morjaria, and V. Fthenakis, "Empirical assessment of short-term variability from utility-scale solar PV plants," *Progress in Photovoltaics: Research and Applications*, vol. 22, No. 5, pp. 548-559, (May 1, 2014).

A. Mills and R. Wiser, "Implications of Wide-Area Geographic Diversity for Short-Term Variability of Solar Power," tech. rep., Lawrence Berkeley National Labratory, (Sep. 2010).

R. Perez, S. Kivalov, J. Schlemmer, K. Hemker Jr., and T. E. Hoff, "Short-term irradiance variability: Preliminary estimation of station pair correlation as a function of distance," *Solar Energy*, vol. 86, pp. 2170-2176, (Aug. 1, 2012).

M. D. Tabone and D. S. Callaway, "Parameterizing Fluctuations in Solar Photovoltaic Generation Using Hidden Markov Models," in *Proceedings of the 2013 IEEE Power & Energy Society General Meeting*, (Vancouver, BC), (Jul. 2013).

M. Berges, E. Goldman, H. S. Matthews, L. Soibelman, and K. Anderson, "User-centered nonintrusive electricity load monitoring for residential buildings," *Journal of computing in civil engineering*, vol. 25, No. 6, pp. 471-480, (May 6, 2011).

A. Cagnano, E. De Tuglie, M. Liserre, R. Mastromauro, et al., "Online optimal reactive power control strategy of pv inverters," *Industrial Electronics, IEEE Transactions on*, vol. 58, No. 10, pp. 4549-4558, (Oct. 2011).

D. B. Arnold, M. Negrete-Pincetic, E. M. Stewart, D. M. Auslander, and D. S. Callaway, "Extremum seeking control of smart inverters for var compensation," in *Power & Energy Society General Meeting, 2015 IEEE*, pp. 1-5, IEEE, (Jul. 26, 2015).

J. Z. Kolter, S. Batra, and A. Y. Ng, "Energy disaggregation via discriminative sparse coding," in *Advances in Neural Information Processing Systems*, pp. 1153-1161, (Dec. 2010).

H. Kim, M. Marwah, M. F. Arlitt, G. Lyon, and J. Han, "Unsupervised disaggregation of low frequency power measurements.," in *SDM*, vol. 11, pp. 747-758, SIAM, (Apr. 28, 2011).

K. Turitsyn, S. Backhaus, M. Chertkov, et al., "Options for control of reactive power by distributed photovoltaic generators," *Proceedings of the IEEE*, vol. 99, No. 6, pp. 1063-1073, (Aug. 4, 2010).

Kara EC, Roberts CM, Tabone M, Alvarez L, Callaway DS, Stewart EM. Towards real-time estimation of solar generation from microsynchrophasor measurements. arXiv preprint arXiv: 1607.02919, (Jul. 11, 2016).

\* cited by examiner

REAL-TIME DISAGGREGATION OF RENEWABLE ENERGY GENERATION ON AN ELECTRICITY DISTRIBUTION SYSTEM

CROSS-REFERENCE TO RELATED APPLICATIONS

This application claims priority to U.S. Provisional Patent Application No. 62/311,319, filed Mar. 21, 2016, and titled "Contextually Supervised Generation State Estimation for Real-Time Disaggregation of PV Generation on an Electricity Distribution System," which is hereby incorporated by reference in its entirety and for all purposes.

STATEMENT OF GOVERNMENTAL SUPPORT

This invention was made with government support under Prime Contract No. DE-AC02-05CH11231 and ARPA-E Contract No. DE-AR0000350 awarded by the U.S. Department of Energy. The government has certain rights in the invention.

FIELD OF THIS DISCLOSURE

This disclosure relates to operation of an electrical power distribution grid.

BACKGROUND

Historically, electrical power distribution grids have existed to facilitate the transfer of power from large, centralized generation sites via a transmission network to the customer. This transfer of power was primarily uni-directional, with minimal interest in the distribution grid as a stand-alone entity. This, however, is set to change as the grid trends from a centrally controlled system to one more distributed in nature.

SUMMARY

Provided herein are systems methods for disaggregating renewable energy at a distribution substation. One aspect involves a method and system for identifying, using a phasor measurement unit, aggregate active power associated with a distribution substation; identifying, using the phasor measurement unit, aggregate reactive power associated with the distribution substation; generating an estimated power factor representing an average value of an effective relationship between the aggregate active power associated with the distribution substation and the aggregate reactive power associated with the distribution substation; determining active power load at the distribution substation based on the estimated power factor and the aggregate reactive power associated with the distribution substation; and determining active power generated by one or more renewable energy sites connected with the distribution substation based on a difference between the aggregate active power total and the active power load only.

In some embodiments, the method and system also include determining an estimated state for a distribution power system using the active power load and the active power generated by one or more renewable energy sites, the estimated state representing detailed status information concerning the distribution power system; and causing display of the estimated state at a user interface of a display device.

In some embodiments, the aggregate reactive power includes reactive power from a plurality of smart meters connected with the distribution substation.

In some embodiments, determining the active power generated by one or more renewable energy sites includes identifying a photovoltaic (PV) irradiance proxy measurement; identifying an effective PV capacity associated with the PV irradiance proxy measurement; and generating a modified value corresponding with the active power generated by one or more renewable energy sites in comparison with the PV irradiance proxy measurement and the effective PV capacity. In some embodiments, the PV irradiance proxy measurement is any one of active power generated by a proxy PV site proximate with the distribution substation, a clear sky irradiance model, a weather station proximate with the distribution substation, one or more satellite irradiance measurements, or one or more ground irradiance measurements. In some embodiments, the modified value corresponding with the active power generated by one or more renewable energy sites is generated by identifying a load variance associated with the active power load measured during a period of non-insolation, the load variance is weighted according to a first weight variance representing an inverse of the load variance; identifying an aggregate variance associated with the distribution substation during a period of insolation; and determining, based on a difference between the aggregate variance and the load variance, a renewable energy variance associated with the active power generated by the one or more renewable energy sites, the renewable energy variance is weighted according to a second weight variance representing an inverse of the renewable energy variance.

In some embodiments, the active power generated by one or more renewable energy sites is an estimated value with a RMSE accuracy of less than 10%.

In some embodiments, the one or more renewable energy sites include any one of a PV site, a hydroelectric site, a wind power site, or a geothermal site.

These and other aspects of this disclosure are described in further detail below.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

This disclosure describes techniques for disaggregating renewable energy generation from aggregate power data obtained from a distribution substation. Aggregate power data can be identified by a phasor measurement unit (PMU). The PMU can identify a sample of aggregate measurements for active power and reactive power. Using the sampled aggregate measurements, a power factor can be estimated and used to determine an active power load at the distribution substation. After determining the active power load, the aggregate active power from the sample can be compared to the active power load such that active power generated by one or more renewable energy sites can be determined. Using this approach can allow for better visibility into the generation of power from intermittent renewable energy sources, which may facilitate analysis of the balance between generation of power and load on distribution grids. An example using FIG. 1 may be instructive.

Figure 1:
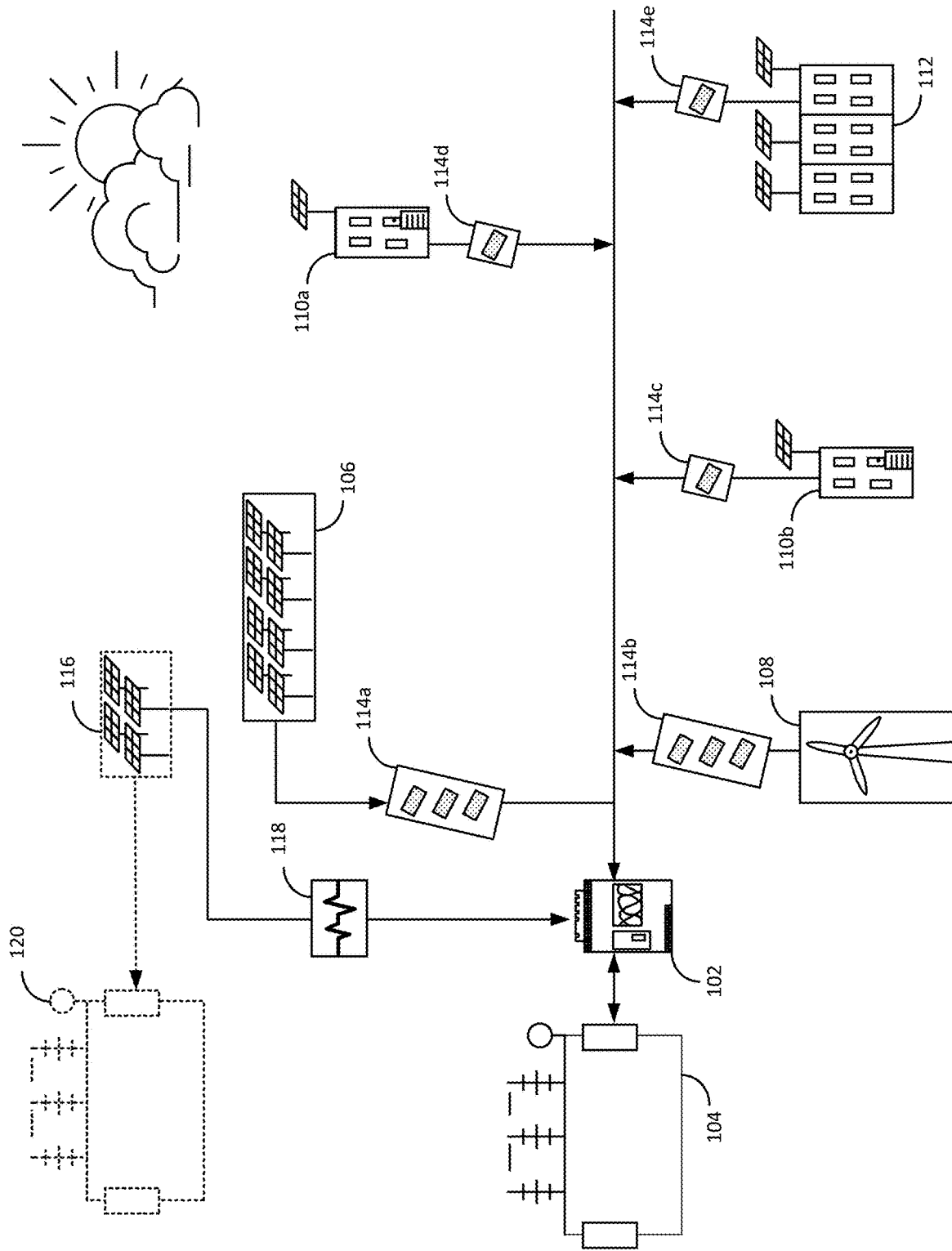
FIG. 1 shows an example of disaggregating active power generated by one or more renewable energy sites connected with a distribution substation.

In FIG. 1, PMU 102 captures and analyzes a variety of physical and/or electrical measurements including phasor or synchrophasor measurements of distribution substation 104. Distribution substation 104 can include a feeder for connecting residential buildings and commercial buildings to the power grid. PMU 102 can include any device capable of measuring phasor data on the power grid. In the example of FIG. 1, PMU 102 is a micro-PMU capable of recording samples at a high rate, e.g., 512 samples per cycle or 120 Hz. PMU 102 can be connected with a feeder of distribution substation 104. In other implementations, multiple PMUs can be installed at various locations of a distribution feeder, for instance, at the distribution substation, at the end of the feeder, or any other type of distribution generation facility. Using samples obtained at distribution substation 104, PMU 102 calculates aggregate active power and aggregate reactive power entering the feeder. Each measurement can be time-synchronized for accuracy and down sampled (e.g., once every minute) such that the active power measurements and the reactive power measurements can be compared with other data sampled at a uniform rate. As discussed further below, down sampled measurements can have high-frequency variations removed using a five minute moving average filter.

Using the measurements captured at distribution substation 104, an estimated power factor can be generated. The estimated power factor can represent the effective relationship between active power and reactive power being measured (e.g., the cotan of the angle between voltage phasors and current phasors). After generating an estimated power factor, an active power load is determined for distribution substation 104 based on the estimated power factor, aggregate reactive power, and an average reactive power load of the distribution substation. For example, the equation, $P_{Load}^T = k_{eff} Q_{PMU1}^T + R + \in_{load}$, can be used to calculate the active power load at distribution substation 104. In this equation, $Q_{PMU1}^T$ represents a reactive power measurement at distribution substation 104 for a particular amount of time, $k_{eff}$ represents an effective relationship between active power and reactive power load in the system, R represents an independent intercept of an average constant load in the system with resistive characteristics, and $\in_{load}$ represents a load variance, or error term for $P_{Load}^T$.

Next, active power generated from behind the meter renewable energy sites can be determined at PMU 102 for distribution substation 104. Starting with a basic accuracy, this determination can be improved with machine learning techniques being applied such that estimation improves through refinement over time. In some implementations, active power generated by renewable energy sites can be measured for a variety of renewable energy sites connected with distribution substation 104. This can include residential and small commercial locations. In the example of FIG. 1, renewable energy sites include PV power generation system 106, wind power generation system 108, residential PV power generation sites 110a and 110b, commercial PV power generation site 112, and proxy PV power generation system 116. Active power 114a-114e is generated by each of the renewable energy sites and fed back to distribution substation 104.

In some implementations, to determine active power generated from renewable energy sites, a PV proxy measurement can be used to refine estimated measurements. In FIG. 1, PV proxy measurement 118 can be identified using proxy PV power generation system 116. In some implementations, proxy PV power generation system 116 is not connected with distribution substation 104, but is still located near enough (e.g., within about 4-5 miles) to distribution substation 104 to provide accurate proxy measurements. Proxy power generation system 116 can be connected with another distribution substation, e.g., proxy distribution substation 120. The equation, $P_{PV}^T = C_{eff} \phi^T + \in_{PV}$, can be used to calculate active power generated from renewable energy sites. In this equation, $\phi^T$ represents PV generation from proxy PV power generation system 116, $C_{eff}$ represents the effective PV capacity of proxy PV power generation system 116, and $\in_{PV}$ represents PV variance, or an error term for $P_{PV}^T$. In some implementations, using refined coefficient values and aggregate measurements from PMU 102, active power load and active power PV can be determined by combining the above-mentioned equations such that, $P_{PMU1}^T = k_{eff} Q_{PMU1}^T + R + C_{eff} \phi^T + \in_{PV} \in_{load}$. Using these equations, active power load and active power from renewable energy sites can be predicted. In some implementations, total variance can be assigned to active power from PV sites, but in other implementations, and discussed in further detail below, contextually supervised source separation can be used to distribute overall variance for both load variance and PV variance. Using some of the disclosed techniques can allow for an improved method of estimating renewable energy generation from behind the meter renewable energy sites such that predicted measurements are obtained with a root-mean-square error (RMSE) of less than 10%, or about 5%, for example about 6% on a 1 minute timescale.

Figure 2:
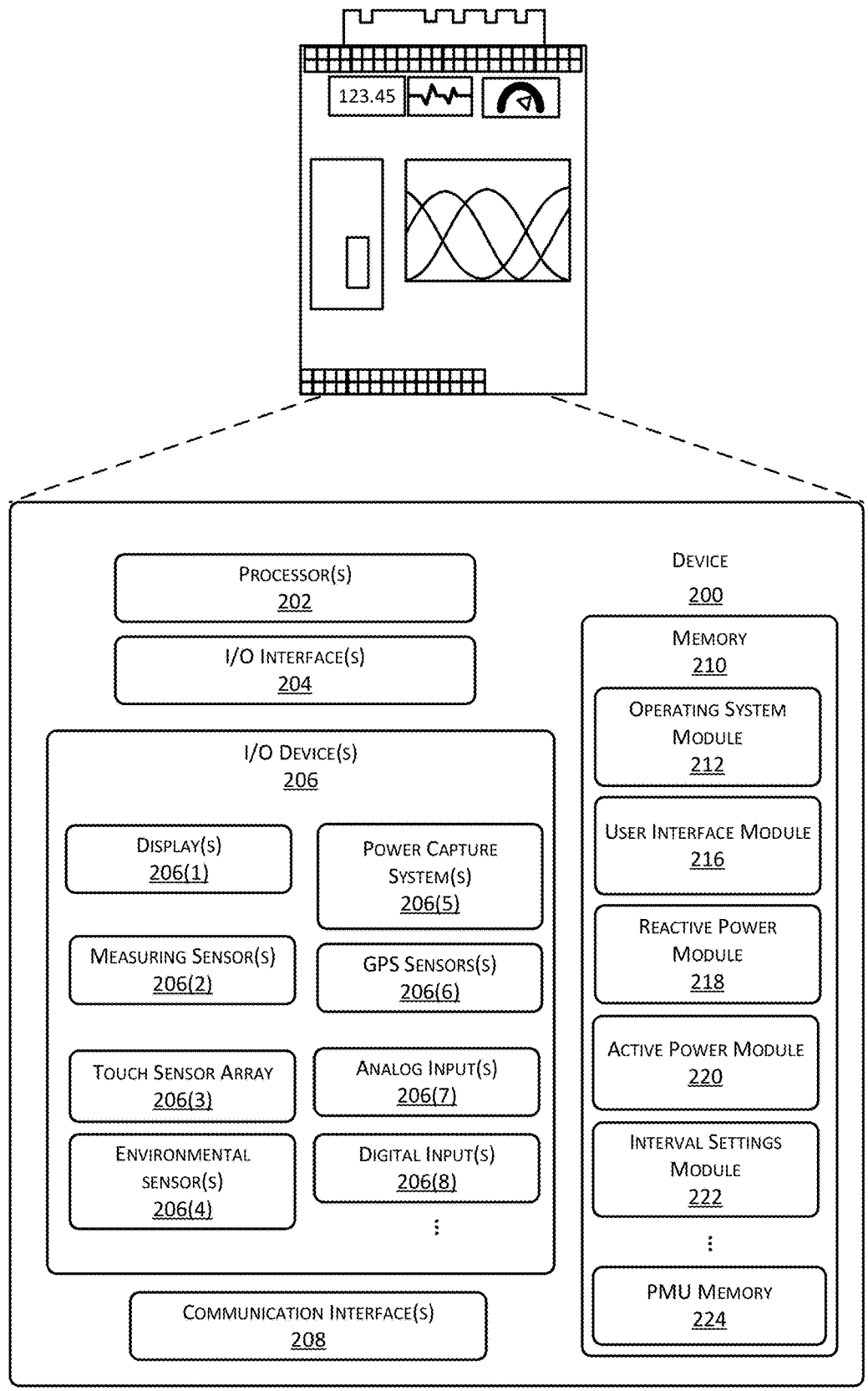
FIG. 2 shows an example of a phasor measurement unit with which various implementations of disaggregating active power generated by one or more renewable energy sites may be practiced.

FIG. 2 shows an example of a phasor measurement unit with which various implementations of disaggregating active power generated by one or more renewable energy sites may be practiced. Device 200 includes one or more single or multi-core processors 202 configured to execute stored instructions, e.g., in PMU memory 224. Device 200 may also include input/output (I/O) interface 204 (e.g., an inter-integrated circuit (I2C) interface, a serial peripheral interface (SPI) bus, a universal serial bus (USB), an RS-232 interface, a low voltage connection interface, etc.) to allow the device to communicate with other devices. I/O interface 204 is coupled to one or more I/O devices 206 used to take physical measurements. Devices 206 include display 206(1), measuring sensors 206(2), touch sensor array 206(3), environmental sensors 206(4), power capture system 206(5), global positioning system (GPS) sensors 206(6), analog inputs 206(7), digital inputs 206(8), and other I/O devices. Measuring sensors 206(2) capture current and voltage phasors for each phase, which are used to determine active and reactive power measurements. Touch sensor array 206(3) can allow for user input with display 206(1) to configure, update, or otherwise interact device 200. Environmental sensors 206(4) include sensors to measuring temperature, humidity, barometric pressure, shock and vibration, etc. Environmental sensors 206(4) can be part of device 200, or physically separate from device 200. Power capture system 206(5) can be configured to operate in a variety of modes. For example, synchrophasor mode can be used to measure voltage magnitude, current magnitude, and phase angle data at a rate of 120 times per second and communicated in near real-time by device 200 to other devices. GPS sensors 206(6) can include a GPS receiver to identify location and time synchronize measurements at device 200. Device 200 can also include a variety of analog inputs 206(7) for sampling voltage and current through a variety of measuring channels. Device 200 may also include one or more communication interfaces 208 configured to provide communications between the device and other devices. Such communication interface(s) 208 may be used to connect to cellular networks, personal area networks (PANs), local area networks (LANs), wide area networks (WANs), GPS satellites, etc. Device 200 can be connected to single-phase or three-phase secondary distribution circuits, and measuring sensors 206(2) can take measurements from a variety of inverter-based energy generation sources, for instance, standard outlets, PV sites, distribution substations, overhead lines, transformers, etc. Device 200 can also be installed in a variety of manners, for instance, a rack-mount installation or a pole mount installation.

Device 200 also includes different types of memory, e.g., memory 210-224. Memory 210 includes non-transitory computer-readable storage media that may be any of a wide variety of types of volatile and non-volatile storage media including, for example, removable storage media (removable SD or microSD cards), electronic storage media, magnetic storage media, optical storage media, quantum storage media, mechanical storage media, etc. Memory 210 provides storage for computer readable instructions, data structures, program modules, and other data for the operation of device 200. Modules 212, 216, 218, 222 may refer to code or computer program instructions integrated to varying degrees with the code or computer program instructions of other such modules. The distinct nature of the different modules described and depicted herein is used for explanatory purposes and should not be used to limit the scope of this disclosure.

Memory 210 includes at least one operating system (OS) module 212 configured to manage hardware resources such as I/O interfaces 204 and/or I/O devices 206 and provide various services and functionality to applications or modules executing on processor(s) 202. Memory 210 also includes a user interface module 216, a reactive power module 318, an active power module 220, an interval settings module 222, and other modules. Memory 210 also includes PMU memory 224 to store a wide variety of instructions and information using any of a variety of formats including, for example, flat files, databases, linked lists, trees, or other data structures. Data identified using any of these modules can be displayed on display 206(1) including, for example, any type of power measurements, e.g., aggregate active power, aggregate reactive power. Device 200 can capture and analyze a variety of measurements, for example, waveform changes, voltage and current harmonics, etc. The logic or computer program instructions used to support and/or make decisions relating to capturing these power measurements may be implemented in a variety of ways. For example, modules 218 and 220 might be implemented as part of measuring sensors 206(2) or, the logic might be one or more separate algorithms implemented to work in conjunction with measuring sensors 206(2). Also or alternatively, modules 218 and 220 may be implemented separately from device 200, with the data captured by measuring sensors 206(2) being sent to a cloud-based application implementing the logic of modules 218 and 220.

Other implementations are contemplated in which at least a portion of the logic or computer program instructions may reside on a separate platform, e.g., server 300 of FIG. 3 discussed below. Suitable variations and alternatives will be apparent to those of skill in the art. It will also be understood that device 200 of FIG. 2 is merely an example of a device with which various implementations enabled by the present disclosure may be practiced, and that a wide variety of other devices types may also be used, e.g., PMUs 304a and 304b of FIG. 3. The scope of this disclosure should therefore not be limited by reference to device-specific details.

Figure 3:
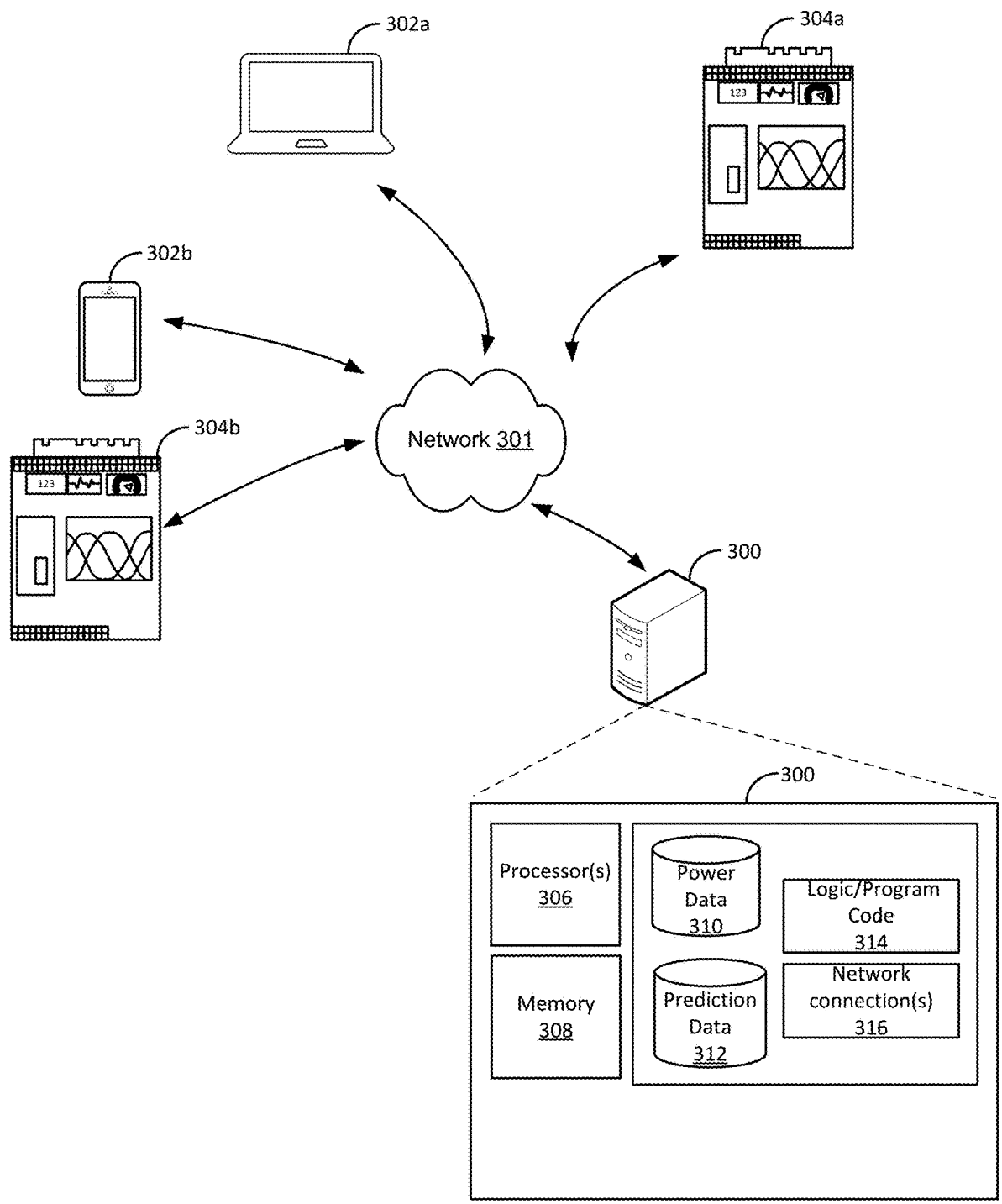
FIG. 3 shows an example of a computing environment in which various implementations of disaggregating active power generated by one or more renewable energy sites may be practiced.

FIG. 3 shows an example of a computing environment in which various implementations of disaggregating active power generated by one or more renewable energy sites may be practiced. In FIG. 3, server 300 communicates via network 301 to a variety of client devices, for instance, client devices 302a and 302b and PMUs 304a and 304b. Server 300 includes processors 306, memory 308, power data 310, prediction data 312, program code 314, and network connection 316. Server 300 includes one or more single or multi-core processors 306 configured to execute stored instructions, e.g., in PMU memory 308. Memory 308 can include some or all of power data 310, prediction data 312, program code 314, and network connection 316. Power data 310 includes near real-time measurements from PMUs 304a and 304b. Power data 310 can be used in conjunction with prediction data 312 to provide estimated active power load at a distribution substation and active power generated by renewable energy sites. Server 300 facilitates various aspects of data management between client devices 302a and 302b and PMUs 304a and 304b. Server 300 may conform to any of a wide variety of architectures such as, for example, a distributed services platform deployed at one or more co-locations, each implemented separate servers. Network 301 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc. Client devices 302a and 302b may be any suitable device capable of connecting to network 301 for receiving and requesting data such as a state estimation from server 300. Such devices may include, for example, mobile devices (e.g., cell phones, smart phones, and tablets), personal computers (e.g., laptops and desktops), wearable computing devices (e.g., smart watches), etc.

Server 300 includes program code 314 configured to determine active power being generated by renewable energy sites as enabled by the present disclosure. For example, program code 314 when used with power data 310 and prediction data 312 can be used to disaggregate active power generated by one or more renewable energy from aggregate active power measured by PMUs 304a and 304b. Similarly, program code 314 can use power data 310 and prediction data 312 to also disaggregate active power load at a distribution substation. Program code 314 might be implemented, for example, as a part of server 300 as shown in FIG. 3. However, it should be understood that alternative implementations are contemplated in which at least some of the functionality represented by program code 314 may be implemented on a separate platform (e.g., PMU 304a, client device 302a, a combination of either, etc.). In addition to providing analyzing power data 310 and prediction data 312, server 300 may also provide a variety of information related to PMUs 304a and 304b to client devices 302a and 302b (e.g., associated metadata, other measurements, device status, etc. It should be noted that, while power data 310, prediction data 312, and program code 314 are contemplated as integrated with server 300, implementations are contemplated in which some or all operate remotely from server 300, and/or some or all are under the control of an independent entity. From these examples, those of skill in the art will understand the diversity of use cases to which the techniques described herein are applicable.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same provider in control of server 300. Alternatively, such resources may be independent of server 300, e.g., on a platform under control of a separate provider of computing resources with which server 300 connects to consume computing resources as needed. It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 4:
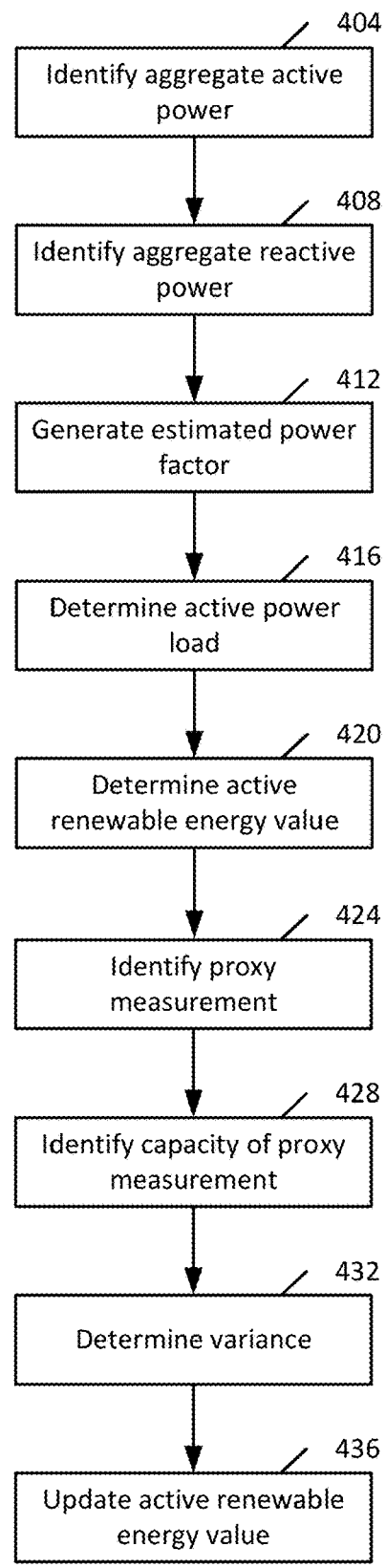
FIG. 4 is a flowchart illustrating disaggregating active power generated by one or more renewable energy sites.

A specific implementation will now be described with reference to FIG. 1 and the flowchart of FIG. 4. In FIG. 4, aggregate active power is identified at a distribution substation using a PMU (404). In some implementations, aggregate active power includes active power generated from one or more renewable energy sites that are connected downstream from a distribution substation. In addition, other sources of active power identified at the distribution substation include traditional sources of power generation such as fossil-fuel power stations. As aggregate active power is identified, aggregate reactive power is also identified at the distribution substation using the PMU (408). Aggregate active power and aggregate reactive power may be sampled at a relatively high sampling rate and time-synchronized using GPS measurements. The high sample rate of the measurements might be down sampled to a variety of standard rates, for instance, five times every minute, once every five minutes, once every minute using interval averages, etc. The one-minute interval may be particularly useful for identifying variability of geographically dispersed renewable energy sites or large individual renewable energy sites.

In some implementations, aggregate reactive power can also be calculated and/or supplemented using smart meters connected with residential sites or commercial sites such as residential PV power generation sites 110a and 110b and commercial PV power generation site 112 of FIG. 1. A smart meter can include measuring devices for recording energy consumption at the site of installation. In some implementations, the smart meter communicates this information at a low sampling rate (e.g., hourly to daily) to a server for further processing. Aggregate reactive power measurements from a large number of smart meters at residential PV power generation sites 110a and 110b, commercial PV power generation site 112, and others can be aggregated at distribution substation 104 for use with identifying aggregate reactive power. Smart meters are not the only other source of reactive power, and other sources of reactive power can be used in the aggregate reactive power calculation. For example, steady-state supervisory control and data acquisition systems can be used to provide reactive power measurements at a sampling rate of once every 15 minutes. It should be understood that these examples are some of many other sources for identifying aggregate reactive power, and the scope of this disclosure should therefore not be limited by reference to details of these examples.

Figure 7A:
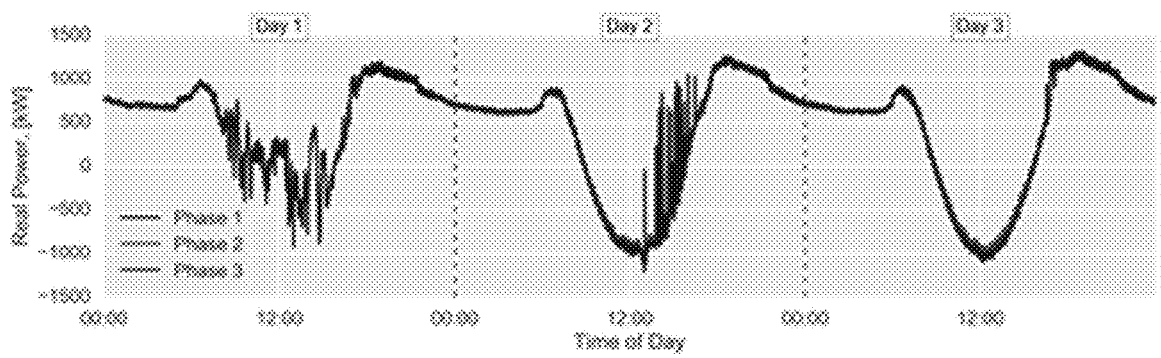
FIG. 7A shows an example of measurements of active power calculated from μPMU1 measurements.
Figure 7B:
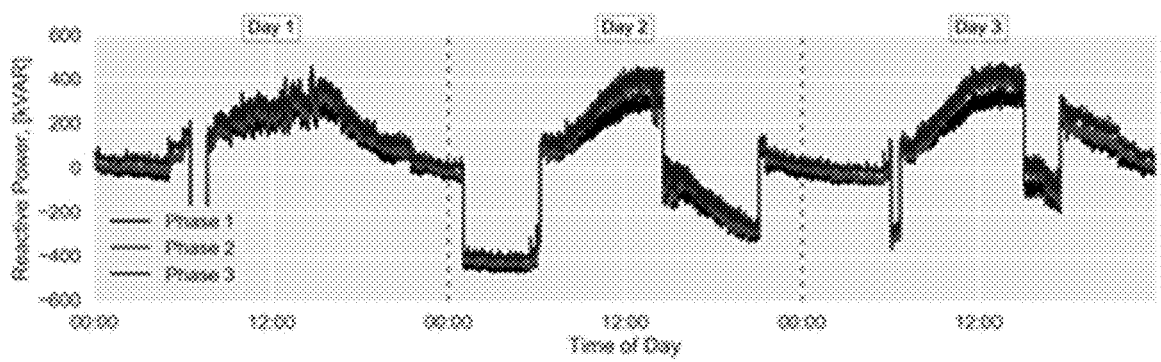
FIG. 7B shows an example of measurements of reactive power calculated from μPMU1 measurements.
Figure 7C:
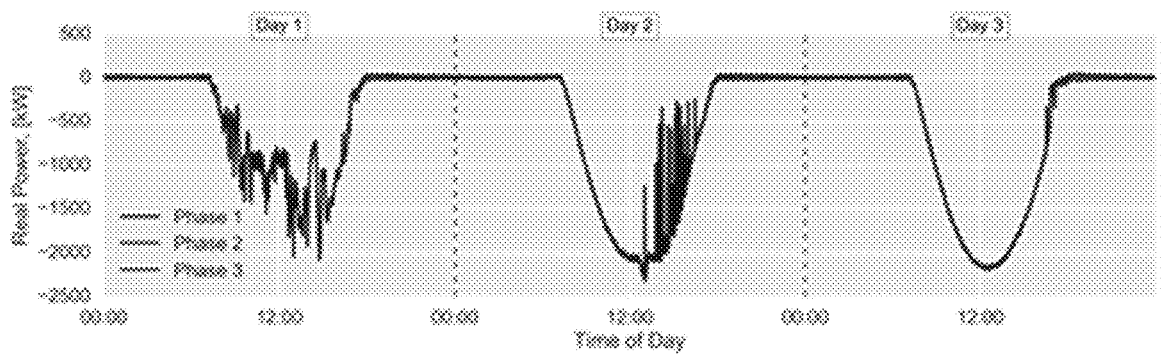
FIG. 7C shows an example of measurements of active power calculated from μPMU2 measurements.

In FIG. 4, an estimated power factor is generated (412). The estimated power factor can represent an average value of the effective relationship between the measurements identified in 404 and 408, which may be the cotan of the angle between voltage phasors and current phasors, or the variable load of distribution substation 104 of FIG. 1. In some implementations, an estimated power factor for PV and load may use measurements during a period of insolation (e.g., daytime) to avoid an assumption that that PV sites have identical power factors. In other implementations, an estimated load power factor includes measurements obtained during a period of non-insolation (e.g., overnight), which can be used to identify a representative insolation load power factor. In this case, in order to obtain a representative value for the load power factor, switching devices, such as capacitor banks, are identified during non-insolation as their use can negatively impact the observed power factor values. To detect the capacitor bank switching events, instantaneous changes in the reactive power demand were identified (e.g., FIG. 7B shows five capacitor bank switching events). After removing the identified events from the data, an accurate load power factor can be identified. As discussed further below, contextually supervised source separation can also be employed to allow for variations in load power factors and PV power factor to adjust throughout the day during insolation.

In FIG. 4, active power load is determined (416). In some implementations, active power load is determined based on an estimated power factor and aggregate reactive power measured at a distribution substation. For example, the equation, $P_{Load}^T = k_{eff} Q_{PMU1}^T + R + \in_{load}$, can be used to determine active power load at a substation. As discussed above, $Q_{PMU1}^T$ represents reactive power measurements identified by a PMU connected with a distribution substation for a particular amount of time. After applying some of the disclosed techniques, an example of a regression coefficient for $k_{eff}$ might be 1.05. An example of the intercept R after applying some of the disclosed techniques might be 2193.556. Other values for these coefficients are envisioned and depend upon the particular environment that some of the disclosed techniques are implemented.

In FIG. 4, active power generated by renewable energy sites is determined (420). In some implementations, a value for active power generated by renewable energy sites include but are not limited to: a PV site, a hydroelectric site, a wind power site, or a geothermal site. In some implementations, a combination of different types of renewable energy sites can be part of an aggregate active power measurement calculated at a distribution substation. Using FIG. 1 as an example, active power 114a-114e comes from a variety of renewable energy sites, for instance, PV power generation system 106, wind power generation system 108, residential PV power generation sites 110a and 110b, commercial PV power generation site 112. However, in other implementations, active power generated from renewable energy sites may come from a single type of source, for instance, residential PV power generation sites. As mentioned above, the equation, $P_{PV}^T = C_{eff} \phi^T + \in_{PV}$, can be used to determine active power generated by renewable energy sites. After applying some of the disclosed techniques, an example of a regression coefficient for $C_{eff}$ might be -47.454, where a positive value indicates consumption downstream from a distribution substation, and a negative values indicates active power contributed to aggregate active power at the distribution substation. As mentioned above, other values for this coefficient are also envisioned and depend upon the particular environment that some of the disclosed techniques are implemented.

In FIG. 4, a renewable energy proxy measurement is identified (424), and a capacity of the renewable energy proxy measurement is identified (428). In some implementations, aggregate reactive power and proxy irradiance measurement can be used as regression variables to estimate active power being generated by renewable energy sites. A variety of renewable energy proxy sources can be used to identify proxy measurements. For example, active power generated by a proxy PV site proximate with the distribution substation, a clear sky irradiance model, a weather station proximate with the distribution substation, one or more satellite irradiance measurements, one or more ground irradiance measurements, etc. In some implementations, to prevent high-frequency variations from lessening the predictive power of a proxy PV site a 5-minute moving average can be used as a high pass filter. In some implementations, proxy measurements include low-sampling PV power output from one or more solar installations or radiance measurements from one or more sensors. As part of measuring renewable energy generated at a proxy PV site. Effective PV capacity is identified for a PV irradiance proxy measurement, as discussed further above. In the equation, $P_{PMU1}^T = k_{eff} Q_{PMU1}^T + R + C_{eff} \phi^T + \in_{PV} + \in_{load}$, effective PV capacity is represented by the coefficient $C_{eff}$.

In FIG. 4, a variance associated with data at a distribution substation is determined (432). The total variance associated with the data at the distribution substation can be identified from an aggregate variance value representing the total error term of the measurements identified at a PMU for a particular amount of time. For example, the equation, $\text{Var}(\in_{Total}) \approx \text{Var}(\in_{PV}) + \text{Var}(\in_{Load})$, can be used to identify aggregate variance. Load variance can be estimated using non-insolation measurements because PV variance does not affect the values $\text{Var}(\in_{Load})$ at this time. In some implementations, load variance can be determined using the following linear equation: $P_{Load}^T = k_{eff} Q_{PMU1}^T + R + \in_{load}$. As mentioned above, aggregate variance can be the sum of load variance and a PV variance. As such, PV variance can be determined by first calculating $\text{Var}(\in_{PMU1})$ during insolation periods. Then, assuming the non-insolation value of $\text{Var}(\in_{Load})$ is representative of the daily variance in load, variance for PV is calculate by finding the difference between $\text{Var}(\in_{PMU1})$ and $\text{Var}(\in_{Load})$. As one example, the equation, $P_{PV}^T = C_{eff} \phi^T + \in_{*PV}$, can be used to estimate PV variance. In other implementations, a PMU connected with a proxy renewable energy site can be used to facilitate accurate measurement of renewable energy variance. In addition, PV variance can be assumed to be a larger value than load variance where the size of the PV sites connected with the distribution substation is known to be a large portion of the aggregate active power. Also or alternatively, estimated variances can be applied to weight re-constructed load and PV generation signals in an estimate of the state of the system, discussed further below.

In some implementations, load variance can be weighted according to a first weight variance, and PV variance can be weighted according to a different weight variance. For example, the following equation can be used to distribute error relative to the accuracy of the estimations for load variance and PV variance:

$$\alpha^* = \frac{1}{\text{Var}(\epsilon_{*Load})} \quad \beta^* = \frac{1}{\text{Var}(\epsilon_{*PV})}.$$

Here, the expected error can be multiplied by the inverse of its respective variance, such that relative accuracy of each estimation is weighted accordingly.

In FIG. 4, an updated active renewable energy value from renewable energy sites is generated (436). In some implementations, the updated active renewable energy is disaggregated from an aggregate active power measurement identified by a PMU. After applying some of the disclosed techniques, starting with basic accuracy and combining machine learning and/or linear regression techniques, estimation of renewable energy from behind the meter sites can be improved such that the value in step 420 is accurate within less than 10%, or about 5%, for example 6% RMSE. Using a proxy measurement and PMU measurements at the distribution substation, values for active power load and active power generated by renewable energy sites can be refined using the following equation:

$$\underset{P_{Load}, PPV, k_{eff}, C_{eff}}{\text{minimize}} \quad (12)$$
$$\{\alpha l_1((P_{Load}^T - k_{eff} Q_{PMU1}^T) + \beta l_2(P_{PV}^T - C_{eff} \phi^T) + g_1(P^t) +$$
$$g2(P_{Load}^T) + h_1(C_{eff}) + h_2(k_{eff})\}$$
$$\text{subject to} \quad P_{PMU1}^T = P_{Load}^T + P_{PV}^T$$

In the above equation, $P_{Load}^T$ is represented as a linear function of reactive power measured at a PMU connected with a distribution substation. $P_{PV}^T$ is represented as a linear function of a PV irradiance proxy measurement $\varphi^T$. $K_{eff}$ represents an estimated power factor, and $C_{eff}$ represents PV capacity corresponding with a PV irradiance proxy measurement. The $\alpha$ and $\beta$ parameters are weighting factors, which function to correct the differences between the reconstructed active power load and active power generated by PV sites. $\alpha$ is represented as a linear function of $\varphi^T$ (e.g., PV generation from proxy PV site), and $\beta$ is represented as a linear function of $Q_{PMUt}^t$ (e.g., aggregate reactive power). Using the above-mentioned techniques can allow for refinement and tuning of the disaggregation weights based on expected performance such that weights can trend toward optimal values.

In some implementations, an estimated state for a distribution power system can be determined for display on a display device using active power load values and active power renewable energy values. For example, information concerning a recent drop in renewable energy generated from behind the meter sites can be displayed to an operator at a control center of the power system. A distribution power system can include an electrical grid and the devices used to operate and/or control the electrical grid. The estimated state can include detailed status information (e.g., voltages, active power load, active renewable energy, aggregate active power, aggregate reactive power, etc.) about electrical distribution within the power system. The status information can be provided to devices (e.g., client device 302a and 302b of FIG. 3) at various control centers for managing the power system and can be displayed to users of the devices. State estimation can be used to identify the voltage magnitudes and angles to gain perspective on where power is moving in the grid, as well as where power is entering the grid (e.g., renewable energy from a PV site) or leaving the grid. More accurate active power measurements for renewable energy site allow for better estimations of the state of the power system, which in turn allow system operators to better evaluate stability margins and damping levels for the power system.

While the subject matter of this disclosure has been particularly shown and described with reference to specific implementations, it will be understood by those skilled in the art that changes in the form and details of the disclosed implementations may be made without departing from the spirit or scope of the invention. Examples of some of these implementations are illustrated in the accompanying drawings, and some specific more specific details are set forth in an example included below. It should be noted that implementations may be practiced without some or all of these specific details. In addition, well-known features may not have been described in detail to promote clarity. Finally, although various advantages have been discussed herein with reference to various implementations, it will be understood that the scope of the invention should not be limited by reference to such advantages. Rather, the scope of the invention should be determined with reference to the claims set forth below.

EXAMPLE

The following example is provided to better illustrate aspects of this disclosure. The implementations of the disclosure are not limited to the details of this example, however.

1. Introduction

A set of methods for estimating renewable energy generation using real-world measurements obtained at a distribution grid substation includes a generation disaggregation scheme where the only information available for estimation is the μPMU measurements obtained at the substation and a proxy solar irradiance measurement. Using these two measurement points, a multiple linear regression strategy is applied in which an effective power factor and a reactive power independent intercept term are estimated, which are then used in disaggregation. Finally, this strategy is expanded to strategically manage the reconstruction errors in the estimators. The solar generation and load are simultaneously disaggregated, and an effective power factor and a reactive power independent intercept term are estimated. It is shown that it is possible to disaggregate the generation of a 7.5 MW PV site with a root mean squared error of about 450 kW.

Accurate estimations of the instantaneous aggregated generation downstream of a measurement device can be useful for numerous applications of power systems operation. One such application is state estimation. The benefit of PMU's for the purpose of distribution system state estimation has been explored in literature, specifically focusing on their benefit in the presence of large PV penetration [1]. The authors noted that the placement of just a single PMU reduced the average RMSE by a factor from 2 to 7, dependent on the total vector error of the measurement device and level of PV penetration. This disclosure further expands the use of PMU's for estimating the instantaneous generation of the feeder, which in turn improves the accuracy of state estimation.

An accurate estimation of the instantaneous distributed generation is also required for contingency analysis. Voltage/frequency fault ride-through requirements are being revised for distributed generation due to its increasing penetration on the gird. In the event of an extreme disturbance, however, these distributed generation (DG) units may trip to protect themselves, and thus render themselves unavailable post-contingency. This tripping would reveal the masked load of the feeder, i.e. the load which had been offset by DG. Operators need real time estimates of this masked load to procure the necessary resources for such an event. Visibility into the masked load of a feeder is also required to anticipate steep ramp rates, e.g. as the PV generation ramps down in the evening and the residential peak is approached.

The use of synchronized phasor measurements to estimate instantaneous generation/load is a concept which has previously been proposed [2] [3]. An exploration of this use, however, has thus far been lacking. This work seeks to utilize highly accurate synchronized phasor measurements of voltage and current waveforms from all three phases obtained from micro-phasor measurement units (μPMU's) to estimate the instantaneous PV generation downstream form the measurement device. These devices, recently developed by Power Standards Lab (PSL) [4], are deployed at Riverside Public Utility (RPU) with a sampling frequency of 120 Hz. The deployment of these devices has the potential to enable advanced data analytics which could facilitate the transformation of the distribution gird into a more dynamical, bi-directional system while maintaining system reliability [5].

Currently there exist two methods of estimating PV generation in real-time. The first of these pertains to the utilization of real-time irradiance measurements and known installed capacity. This model based approach attempts to leverage one or more irradiance sensors, and model effects such as cell temperature, to produce to estimate the generation a number of PV sites. It will be shown in Section 2 that there exists an inherent accuracy barrier arising from the use of these irradiance measurements that makes this approach unsuitable for accurate real-time estimations. The second method exploits the requirement for metering for PV sites above a specified capacity threshold. These meters, however, when present are typically low granularity measurements and are often not required on residential installments, thus offering limited visibility. The methodology described herein offers the potential for a significant improvement on these approaches.

The main purpose of this study is to investigate ways to disaggregate solar generation from aggregate information obtained at a substation level. In particular, we are interested in disaggregation schemes that require the least amount of information and can provide an accurate, close to real-time monitoring of the actual PV generation on the feeder. For this purpose, we first describe a disaggregation scheme where the only information available is the μPMU measurements obtained from the substation. In this strategy, we leverage heuristics on PV inverter and load characteristics to estimate the total amount of PV generation in the feeder. We refer to this methodology as power factor based estimator (PFBE). We then describe a separate strategy in which we assume measurements from the substation as well as a proxy solar irradiance measurement are available. In this instance this proxy solar irradiance corresponds to the real power output of a nearby solar installation on a separate circuit. Using these two measurement points, we first describe a multiple linear regression strategy, in which we estimate an effective power factor, which then is used in disaggregation. We refer to this estimator as the linear estimator (LE). Finally, we expand this strategy to a contextually supervised source separation, building on the methodology proposed in [6]. In this strategy, we simultaneously disaggregate the PV generation and load, and estimate an effective power factor. We refer to this methodology as the contextually supervised generation estimator (CSGE). In the following sections, we first introduce the related work and the dataset, and then explore the strategies briefly described above.

2. Related Work

The dominant method for predicting the output of PV systems is the model based approach. In order to understand this approach, and how the described methodology in this disclosure offers a significant improvement for the purpose of real-time estimation, the limiting factors of the model based approach are briefly touched upon. The critical input to these models is the plane-of-array (POA) irradiance. The POA irradiance on a tilted plane, $E_s$, whose tilt is s degrees from the horizontal can be calculated using equation (1) [7].

$$E_s = E_{dni} \cos \theta + E_{dhi} R_d + \rho E_{ghi} R_r \quad (1)$$

The dominant inputs to equation (1) for calculating the POA irradiance, and those which will be briefly discussed, are $E_{dni}$, the Direct Normal Irradiance (DNI), and $E_{dhi}$, the diffuse horizontal irradiance (DHI). Given accurate measurements of both DNI and DHI an accuracy in estimating $E_s$ circa 5% was obtained for a 40° tilted south-facing panel[7]. The issue, however, is that accurate measurements of both DNI and DHI are costly to obtain and therefore, typically, only the global horizontal irradiance (GHI), $E_{ghi}$, is measured [7] [8]. In this case both the DNI and DHI need to be estimated from a given GHI measurement. A total of ten models were examined in [7] for estimating both the DNI and DHI, given site specific GHI measurements, with typical DNI RMSE of≈15% for all sky conditions. Furthermore, in a follow-up study [8], the author concluded that no model was found to perform consistently well over all-sky conditions and that, generally, the more recent models did not seem to outperform models introduced 30 years ago. The use of satellite derived estimations appears to offer no significant improvement in performance [9] [10]. The inaccuracy in estimating the DNI seems to make it unfeasible to utilize real-time irradiance measurements for real-time disaggregation of DG. In this work the use of an irradiance proxy, in the form of real power output of a single PV installation, will seek to overcome this issue by negating the need to explicitly estimate each of the inputs to equation (1).

One study which did attempt to utilize satellite irradiance data and the model based approach to anticipate aggregate PV ramp rates for 86 distributed generation systems was [10]. An MAE and RMSE between 15-20% was achieved with respect to the net-metered measurements of PV output. The authors concluded that the primary source of this error stemmed from the inaccuracy of the satellite estimated irradiance rather than the model employed to estimate power production. This is in line with the conclusions reported in [7] and [8] regarding the accuracy of estimating the POA irradiance. This inaccuracy, coupled with the frequency of the data, 30 min resolution for this particular study, leaves significant room for improvement for the purpose of real-time disaggregation.

In addition to uncertainties in the estimation of the DNI and DHI there exist further potential sources of error in the model based approach which may be difficult to accurately account for. One such source of error is the estimation of the soiling losses, the accumulation of particular matter on PV systems. These soiling losses averaged 0.051%/day during dry periods for a sample of 1286 residential and commercial PV sites in California [11]. There were significant differences, however, between rates with 26% of sites having losses above 0.1% losses/day while systems with a tilt angle <5° had mean soiling losses of 0.18%/day. There were no statistically significant differences observed by region, making such a phenomenon more difficult to model. The effect of ground conditions, and similar particulate matter contributors, coupled with cleaning methods, when employed, introduce difficulties in estimating the soiling losses of aggregate PV sites such as a residential feeder.

Another such modeling error includes the degradation of an array, of which an extensive review of reported values [12] have been estimated to have a median and mean rate of 0.5%/year and 0.8%/year respectively. These phenomena coupled with modeling issues such as cell temperature introduces individual errors whose propagation limits the reliability of feeder specific generation estimations. In this disclosure, we seek to develop a methodology that captures the aggregate effect of these impact factors instead of modeling each explicitly, thus improving the estimation accuracy.

3. Data

Figure 5:
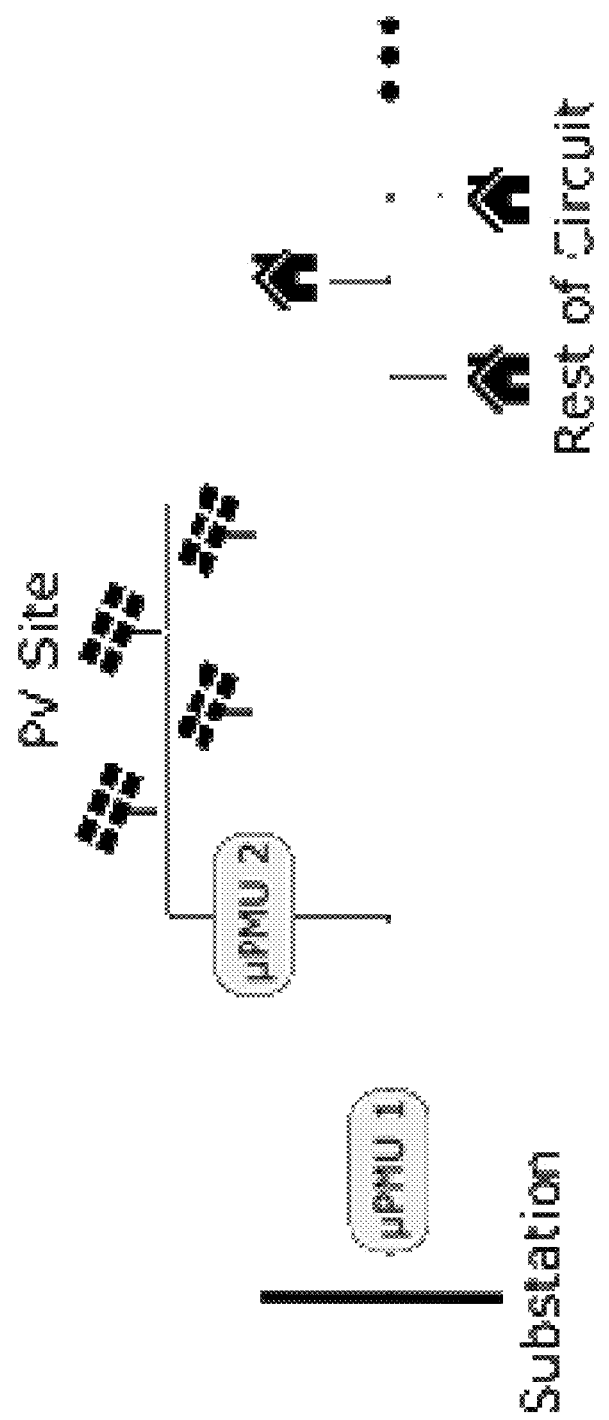
FIG. 5 shows an example of a simplified circuit diagram showing measurement locations.

The data used in this study were obtained from two pPMUs located in Riverside Public Utility territory. The first µPMU (µPMU 1) is connected at the substation, while the second µPMU (µPMU 2) is at the point of interconnection of a 7.5 MW capacity PV generation site further downstream from the substation. FIG. 5 shows the location of both pPMUs in the distribution grid. Each µPMU outputs the current and voltage phasors for each phase, from which we obtain real and reactive power, at a rate of 120 Hz.

Figure 6:
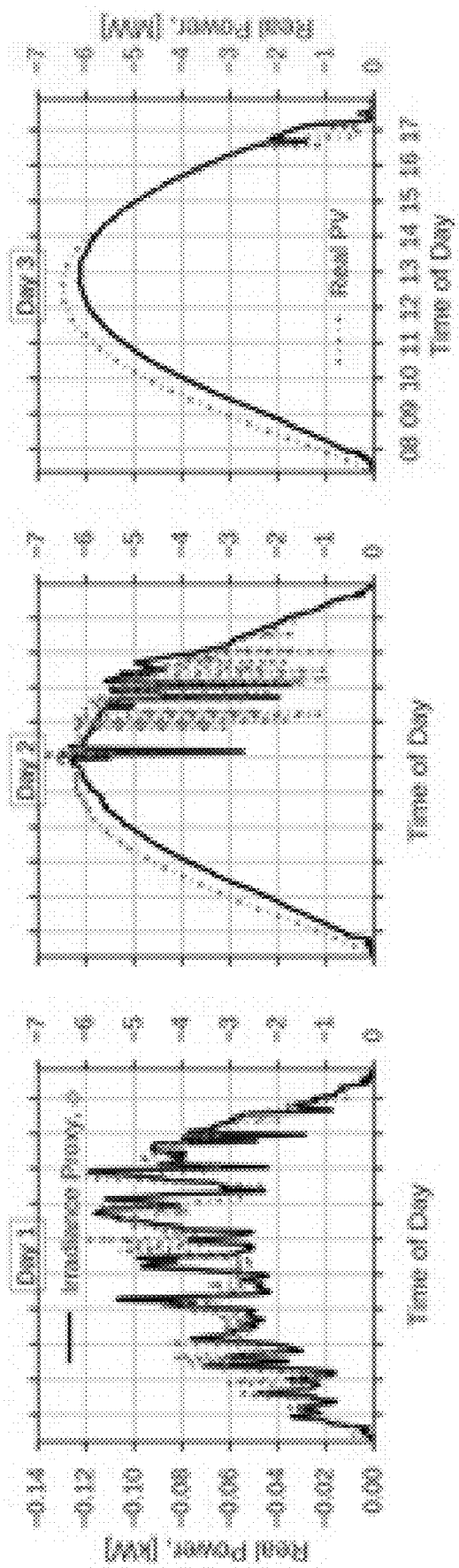
FIG. 6 shows an example of proxy irradiance measurements obtained from a nearby photovoltaic site and the photovoltaic generation real power calculated from μPMU2 measurements.

A nearby PV system at UC Riverside's CE-CERT microgrid [13], 4 miles from the monitored substation, also provided generation data during our study period at a time resolution of 1 minute. For generation disaggregation purposes, we time-synchronize all measurements used in this study. Specifically, we downsample real and reactive power readings obtained from pPMUs to once every minute using interval averages. In terms of critical time scales of interest, as demonstrated in [14], it is the minute scale which is of primary interest when studying the variability of geographically dispersed or large individual PV sites. This arises due to variations in cloud cover both across PV sites and across arrays within individual sites. FIG. 6, shows the irradiance proxy measurements and the ground truth PV generation on separate axes for the same time period. It is possible to see the differences in cloud cover between the two measurement points.

Section 6.1 further discusses the effect of time resolution of readings on our method's ability to recover true solar generation. This PV system is not connected to the same feeder that we monitor with pPMUs, thus its generation does not affect net-load at the substation. We instead use it as a source of information to predict the unknown amount of PV generation on the feeder. Many previous studies show that high frequency variations in PV generation are less spatially correlated than lower frequency variations [15, 16, 17]. To prevent high frequency variations from lessening the predictive power of the nearby PV system, we remove them using a 5 minute moving average as a high pass filter.

4. Power Factor Based Estimator

For the generic case of a µPMU measuring the power demand of a feeder, the measured apparent power, $S_{PMU,t}^{k}$, can be expressed as a summation of the apparent power of the load, $S_{Load,t}^{k}$, and the apparent power of installed PV, $S_{PV,t}^{k}$. This can be represented with the following equation for each phase k at time t:

$$S_{PMU_1,t}^{k} = S_{Load,t}^{k} + S_{PV,t}^{k} \quad (2)$$

Expanding on equation (2), one can formulate the following equation:

$$\begin{bmatrix} \cos\Phi_{Load,t}^{k} & \cos\Phi_{PV,t}^{k} \\ \sin\Phi_{Load,t}^{k} & \sin\Phi_{PV,t}^{k} \end{bmatrix}^{A} \times \begin{bmatrix} |S_{Load,t}^{k}| \\ |S_{PV,t}^{k}| \end{bmatrix} = \begin{bmatrix} P_{PMU,t}^{k} \\ Q_{PMU,t}^{k} \end{bmatrix} \quad (3)$$

where $P^k$ and $Q^k$ correspond to the measured active and reactive power on phase k, respectively, and $\Phi^k$ denotes the phase difference between the voltage and current, whereby $\cos(\Phi^k)$ is the power factor.

In equation (3), the measured phase angle terms, $\Phi_{PMU,t}^{k}$ and the apparent power term $S_{PMU,t}^{k}$ can be obtained in real time from the measurements at the feeder head µPMU. Hence, the right hand-side of equation 3 is available to the PFBE. The goal is to obtain the unobserved load and PV apparent power values, $S_{Load,t}^{k}$ and $S_{PV,t}^{k}$ respectively. For that, we must know the phase angle differences, $\Phi$, and in order to disaggregate the unobserved apparent power terms, this matrix must be invertible. To make this matrix invertible, we make the following assumptions on load and PV generation behavior. First, we assume that the load power factor and PV generation is constant. Since a large number of loads are fed from this distribution feeder, we assume that the fluctuations in load power factor are minimal, hence it can be assumed constant throughout the estimation period. Similarly, since the PV generation is connected through a controllable inverter, we assume that the inverter is set to provide active power only (i.e., $\Phi_{PV,t}^{k}=180°$). This assumption is based on current policies, whereby distributed generation is not required to provide voltage support and therefore will seek to maximize its revenue by maximizing its active power output. Then, to make the matrix A invertible, it is clear that $\cos\Phi_{PV,t}^{k} \sin\Phi_{Load,t}^{k}$ must be nonzero. Hence, $\sin\Phi_{Load,t}^{k}$ must be non-zero. Therefore, the matrix A is invertible for $\phi_{Load,t}^{k} \neq \{90°, 270°\}$. FIGS. 7A-7D show active and reactive power calculated for all phases using µPMU measurements.

Estimating Load Power Factors. Estimating the power factor of load, $\cos\Phi_{Load,t}$, can be done in various ways. For the PFBE, we describe learning a representative power factor value from the µPMU$_1$ measurements obtained during periods where there is no PV generation in the system (i.e. overnight). Thus, we inherently assume that the overnight power factor values are representative of the load power factor throughout the day as well. To obtain a representative value for the load power factor, we first need to account for any switching devices, such as capacitor banks, that might impact the observed power factor values. As shown in FIG. 7B, there are 5 distinct capacitor bank switching events. In the following section, we introduce a strategy to detect and account for the capacitor bank switching impacts on reactive power for the purpose of estimating the load power factor.

4.1. Detecting and Compensating for Capacitor Bank Switching

Figure 8:
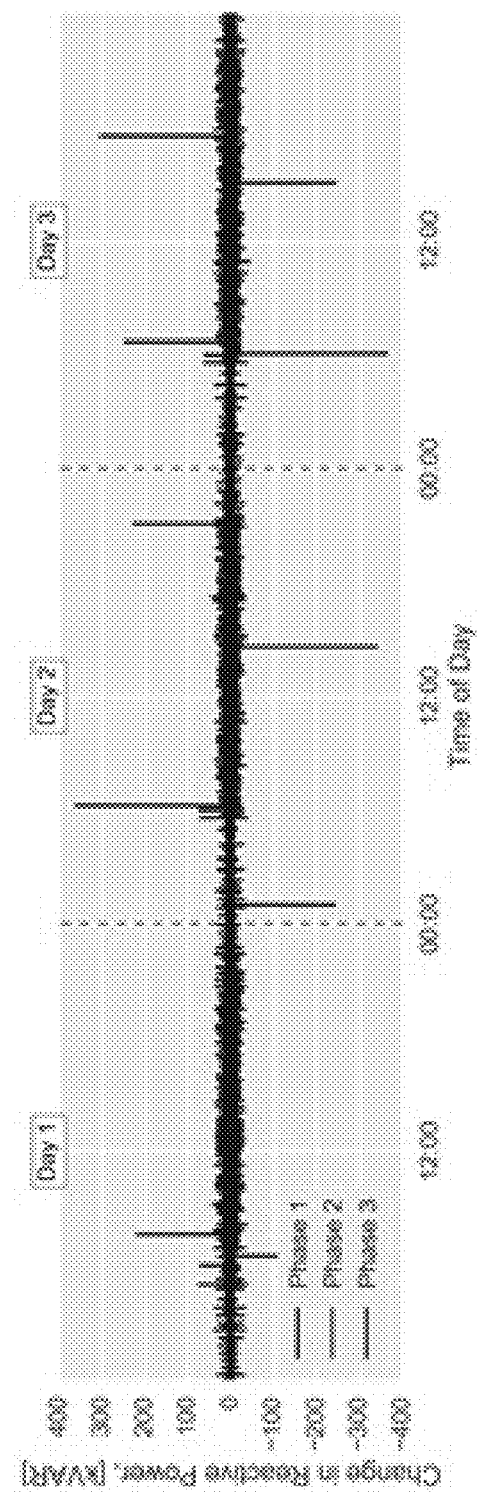
FIG. 8 shows an example of measurements of one second change in the observed reactive power QPMU1, t.

To detect the capacitor bank switching events, instantaneous changes in the reactive power demand were identified. For such events, we use the raw µPMU measurements obtained at 120 Hz. Differences in measured reactive power were calculated once every second using interval averages. In FIG. 8, the difference of measured reactive power was plotted and it is possible to identify these capacitor bank changes by visual inspection. A threshold-based computer-implemented detection algorithm was used to automatically detect capacitor bank switching. Similar algorithms were previously used in non-intrusive load monitoring studies [18] to identify state changes in devices. In this disclosure, the following computer-implemented algorithm is provided to detect and account for capacitor bank switching events:

Compensation=0
While True do

-continued

```
ΔQ_t = Q_{PMU1, t-1} - Q_{PMU1, t};
If | ΔQ_t | ≥ 90 kVAR per phase then
    compensation = ΔQ_t + compensation;
end
if | compensation | < 90 kVAR per phase then
    compensation = 0;
end
Q_{PMU1,t}^{filtered} = Q_{PMU1,t} + compensation;
```

In this computer implemented algorithm, the compensation term stores the amount of compensation to reverse the impact of the capacitor bank on the reactive power. We have used a threshold of 90 kVARs per phase to detect and label a change in reactive power as capacitor bank reactive power injection.

As discussed further above, FIG. 3 illustrates one example of a computer system environment for implementing the techniques disclosed herein. However, other environments may also be used for implementing the disclosed techniques. For example, a computer system can include any number of processors (also referred to as central processing units, or CPUs) that are coupled to devices including memory (typically a random access memory, or "RAM") and memory (typically a read only memory, or "ROM"). The processors can be configured run an algorithm for PV solar disaggregation, as described herein. As is well known in the art, memory acts to transfer data and instructions uni-directionally to the CPU and memory are used typically to transfer data and instructions in a bi-directional manner.

Both of these memory devices may include any suitable type of the computer-readable media described above. A mass storage device is also coupled bi-directionally to a CPU and provides additional data storage capacity and may include any of the computer-readable media described above. The mass storage device may be used to store programs, data and the like and is typically a secondary storage medium such as a hard disk that is slower than memory. It will be appreciated that the information retained within the mass storage device, may, in appropriate cases, be incorporated in standard fashion as part of another memory, e.g., virtual memory. A specific mass storage device such as a CD-ROM may also pass data uni-directionally to the CPU.

A CPU can also coupled to an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU may be coupled to an electrical distribution system controller. Finally, CPU optionally may be coupled to a computer or telecommunications network using a network connection. It is contemplated that the CPU might receive information from the system or network, or might output information to the system or network in the course of performing the above-described process steps. The above-described devices and materials will be familiar to those of skill in the computer hardware and software arts.

Figure 9:
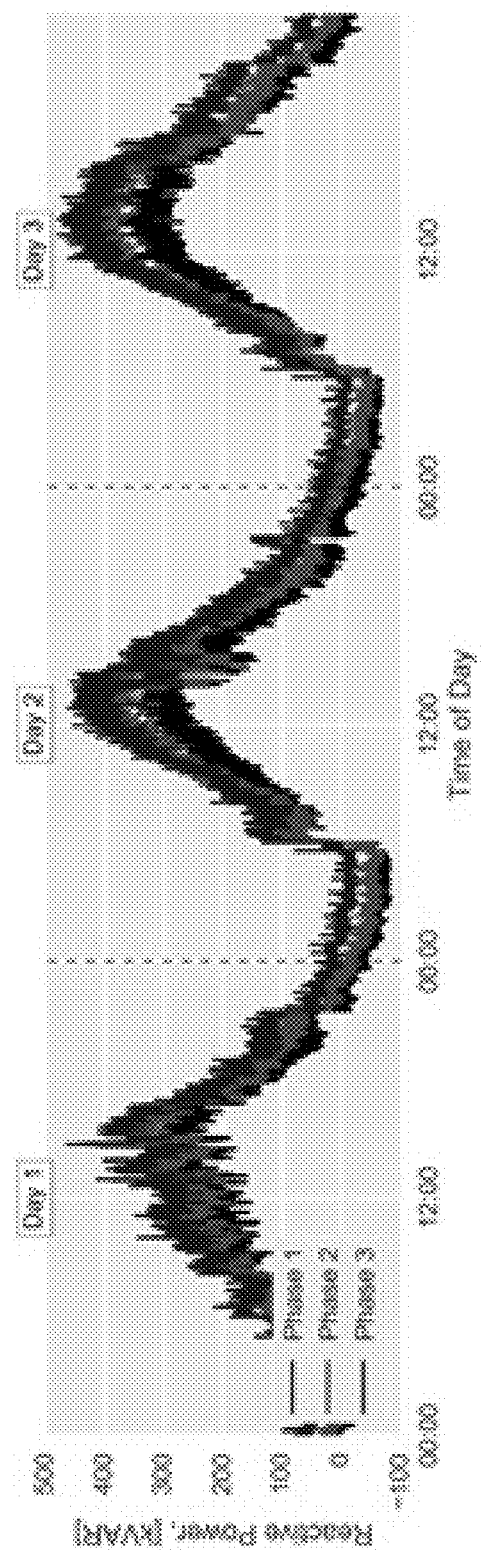
FIG. 9 shows an example of measurements of reactive power calculated using measurements obtained from μPMU2.

FIG. 9 shows the reactive power values after the compensation for capacitor bank actions. When compared with FIG. 7B, it is possible to see that the capacitor bank switching events are compensated for.

TABLE 1

Estimated and assumed power factor values used in this study.

| Phase, p | | Day 1<br>1 2 3 | Day 2<br>1 2 3 | Day 3<br>1 2 3 |
|---|---|---|---|---|
| I | $\cos\Phi_{Load}^k$ | .999 .995 .996 | .999 .997 .998 | .998 .999 .999 |
|   | $\cos\Phi_{PV}^k$ | −1 | −1 | −1 |
| II | $\cos\Phi_{Load}^k$ | 0.97 | 0.97 | 0.97 |
|    | $\cos\Phi_{PV}^k$ | −1 | −1 | −1 |

4.2. Solar Disaggregation Using Load Power Factor

Figure 10:
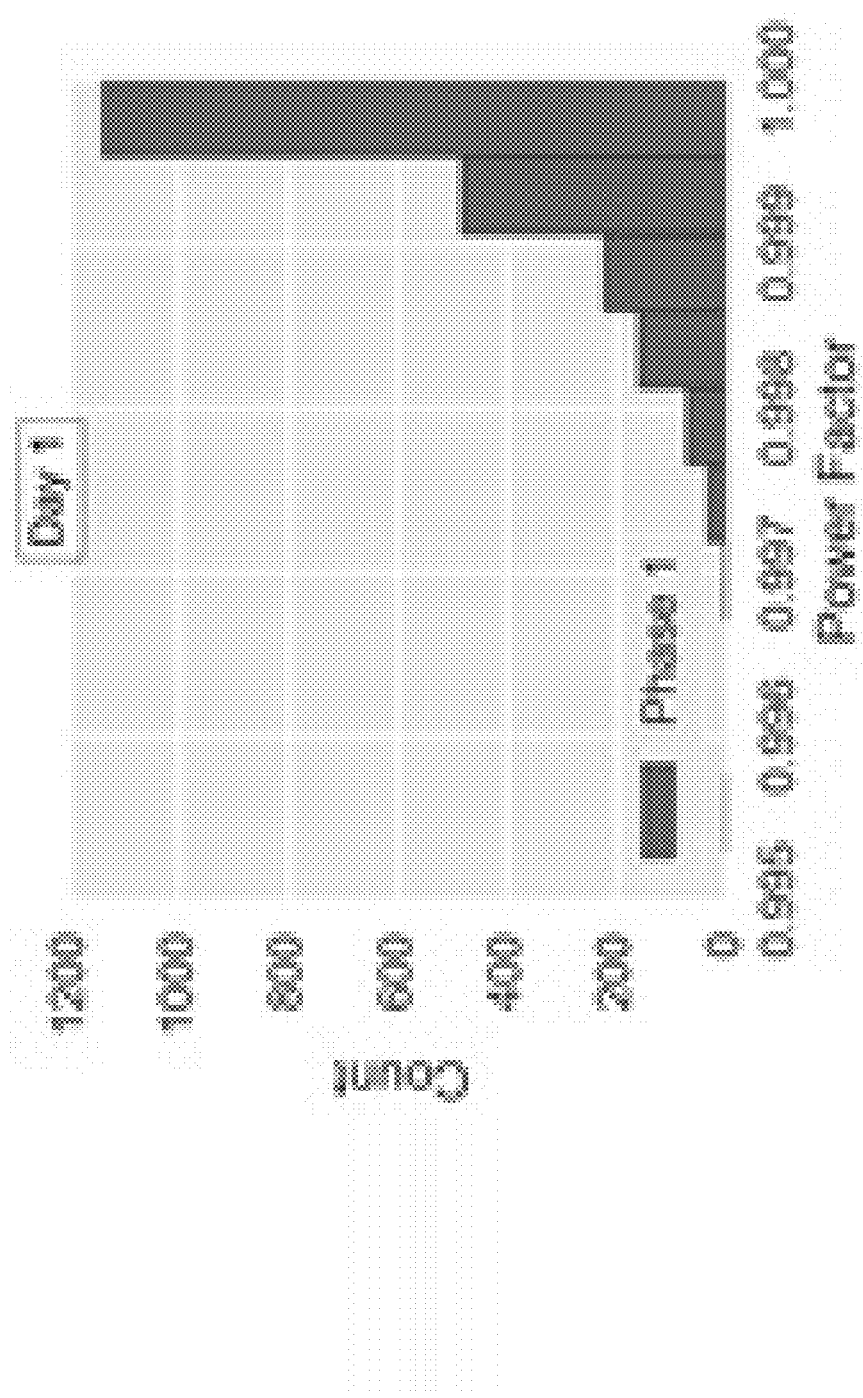
FIG. 10 shows an example of a graph showing distribution of load power factor values estimated for phase 1.

After removing the effects of the capacitor bank switching, we use measurements of load power factor obtained overnight (i.e., no insolation) to be representative of the load power factor. FIG. 10 shows the distribution of load power factor values estimated for Phase 1 using measurements from Day 1 between 12 AM and 5 AM. The median cos $\Phi^k_{PMU,t}$ where $t \in [12\ AM, 5\ AM]$ value will be used as a proxy load power factor for disaggregation purposes. We will refer to the time invariant estimated power factor of load as $\cos\Phi^{-k}_{Load}$. Hence, the A matrix can be re-written as:

$$A = \begin{bmatrix} \cos\tilde{\Phi}_{Load}^k & -1 \\ \sin\tilde{\Phi}_{Load}^k & 0 \end{bmatrix} \quad (4)$$

For each phase using estimated power factor values and observed measurements from the μPMU$_1$, one can estimate $S^k_{PV,t}$ and $S^k_{Load,t}$ using the following equation:

$$A \times \begin{bmatrix} |S^k_{PMU,t}| \cos\Phi^k_{PMU,t} \\ |S^k_{PMU,t}| \sin\Phi^k_{PMU,t} \end{bmatrix} = \begin{bmatrix} P^k_{PMU,t} \\ Q^k_{PMU,t} \end{bmatrix} \quad (5)$$

The estimated median load power factors and the assumed PV power factors are given in Table 1 for each day and phase.

Figure 7D:
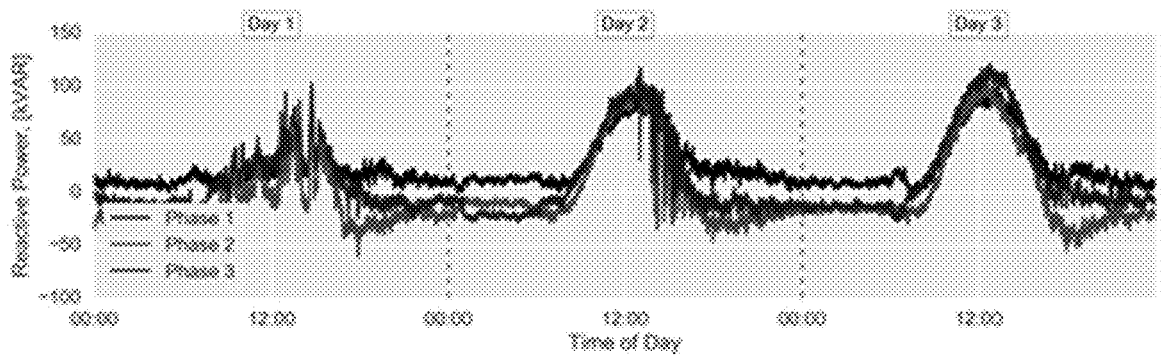
FIG. 7D shows an example of measurements of reactive power calculated from μPMU2 measurements.
Figure 11:
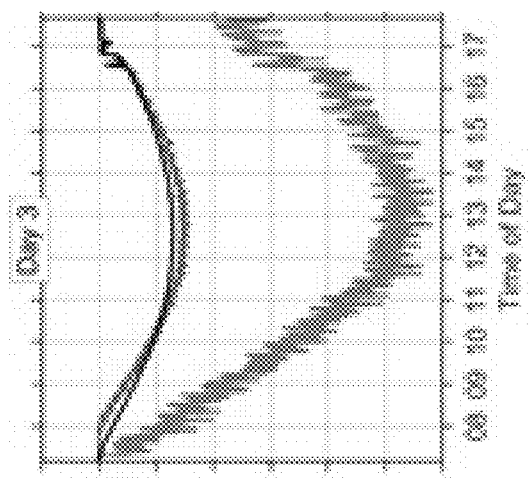
FIG. 11 shows an example of measurements of estimated generation using learned and sample PF.
Figure 11:
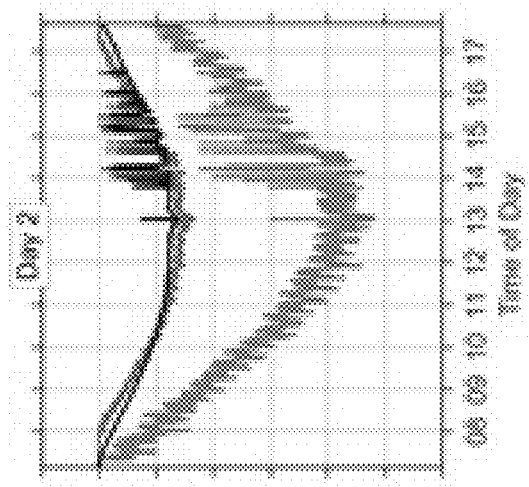
Figure 11:
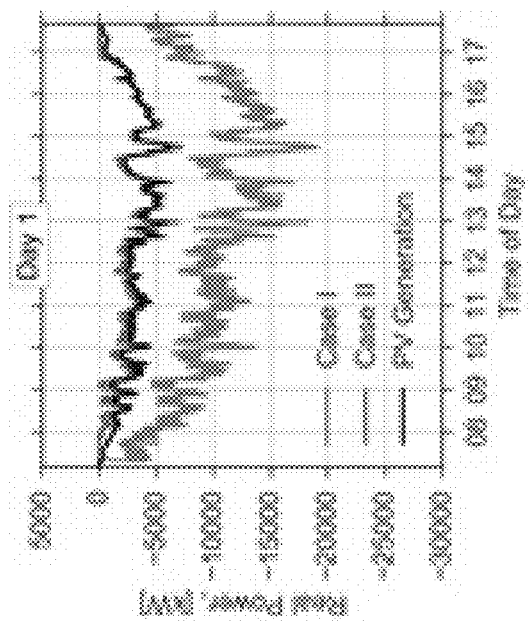

FIG. 11 shows the estimated generation corresponding to each of the cases outlined in Table 1. The estimation of the power factor via the observed nightly power factor leads to a large overestimation in the PV generation. To understand the source of this error, the assumptions must be re-visited. The primary source of this error propagates from the assumption of the power factor of the PV being −1. This implies that the PV site neither consumes nor injects reactive power into the network. FIG. 7D, however, shows this assumption is not valid. The PV site appears to consume reactive power, with a peak consumption circa 100 kVAR/phase. Furthermore, we can see that this consumption represents a large fraction of the reactive power consumed by the feeder, as measured by the feeder head μPMU. FIG. 7B shows a feeder daily reactive consumption peak of circa 400 kVAR/phase. Therefore, the PV site accounts for ≈25% of the reactive power consumed on the feeder. The PFBE method, however, attributed this reactive power consumption to the load, which resulted in an overestimation of the load and a corresponding overestimation of the generation. The PFBE method is heavily punished due to the reactive power consumption of the PV site being non-negligible with respect to the reactive power consumption of the load. This particular feeder is an outlier in terms of its PV penetration and, correspondingly, the impact of the reactive behavior of the PV on this model. These results indicate a more generalizable methodology is required. To achieve this goal, we describe two methodologies in the next sections. Specifically, in Section 5 we evaluate a linear estimator for load and PV that relaxes the assumption that PV systems have a unity power factor. In Section 6 we employ contextually supervised source separation, which allows for variations in load and solar power factor throughout the day.

These techniques seek to estimate a power factor closer to that of case 2 in FIG. 11. The development of a methodology robust to the reactive behavior of the PV will be particularly beneficial, as distributed generation is expected to participate in reactive power control in the future [19, 20].

5. Linear Estimator

Although the described PFBE is computationally inexpensive, it transfers all the variability in reactive power to the load. It also neglects any information on the solar generation, which is easy to obtained using a clear sky radiance model, a nearby weather station, or nearby PV systems that monitor and readily report power generation. As an initial step towards obtaining a more representative load behavior, we describe a linear prediction of PV generation in the system $P_{PV}^T$ based on measured generation from a nearby PV system, $\varphi^T$; where $C_{eff}$ is the coefficient on the generation from the nearby system (i.e. an effective PV capacity) and $\in_{PV}$ is the error term for the described model. The described model is given as follows:

$$P_{PV}^T = C_{eff} \varphi^T \in^T + \in_{PV} \quad (6)$$

Equation (7) presents a similar model for load; where load is linearly predicted by reactive power measured at PMU, $Q^T_{PMU1}$, and an intercept. The coefficient $k_{eff}$ can be considered as an average term that captures effective term that captures the relationship between the reactive and active power $$P_{Load}^T = k_{eff} Q_{PMU1}^T + R + \in_{load} \quad (7)$$

In our current setting, we do not have access to $P_{Load}^T$ or $P_{PV}^T$. However, we observe the aggregate measurements $P_{PMU1}^T$. Hence, we can combine the models presented above as follows:

$$P_{PMU1}^T = k_{eff} Q_{PMU1}^T + r + C_{eff} \varphi^T + \in_{PV} + \in_{load} \quad (8)$$

Since our main focus is to obtain accurate reconstructed signals $\hat{P}_{Load}^T$ and $\hat{P}_{PV}^T$, the described linear regression has drawbacks. OLS minimization will recover estimates for coefficients, $\hat{C}_{eff}$ and $k_{eff}$, but will not separate the lumped error term into the individual errors from the load or PV models. Hence, we cannot expect to recover the true $P_{Load}$ or $P_{PV}$. However, given the size of the PV system studied here, and the generally high variability of PV generation compared to load, we expect that; thus $\in_{Load} \ll \in_{PV}$; thus $\in_{PV} \approx \in_{Total}$.

Equation (9) applies this assumption to recover $\hat{P}_{Load}^T$ and $\hat{P}_{PV}^T$ by assigning all residuals from the regression to PV generation.

$$\hat{P}_{Load}^T \hat{k}_{eff} \hat{Q}_{PMU1}^T + \hat{R}$$

$$\hat{P}_{PV}^T = P_{PMU_1}^T - \hat{P}_{Load}^T \quad (9)$$

Figure 12B:
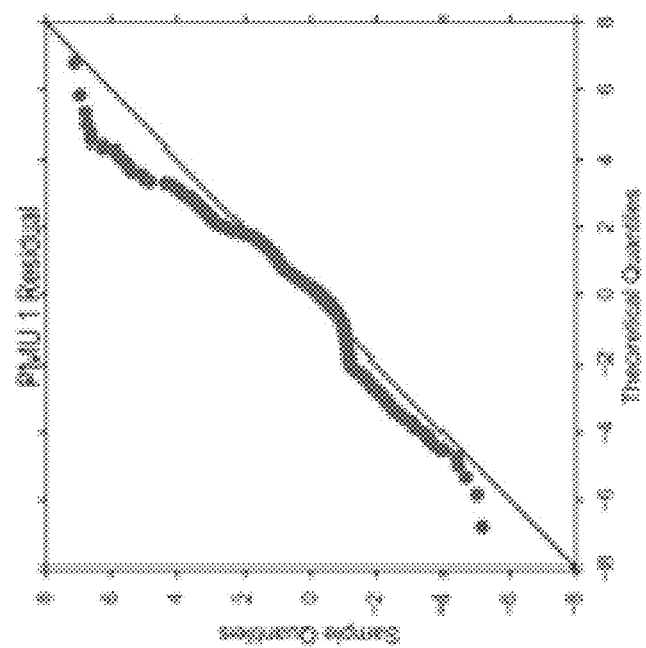
FIG. 12B shows an example of a Q-Q plot of regression results for a linear estimator equation.
Figure 12A:
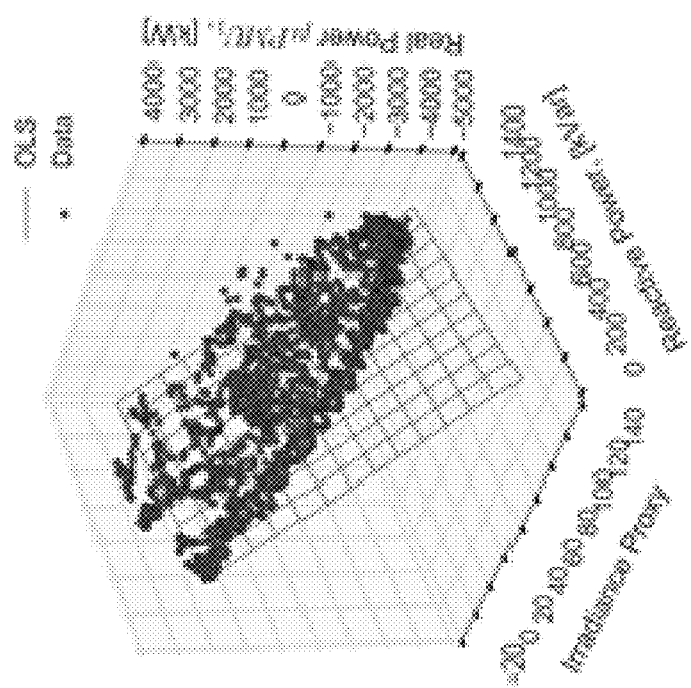
FIG. 12A shows an example of data points and corresponding ordinary least squares regression.

In FIG. 12A, we demonstrate the resulting plane represented by the multiple linear regression model presented in equation (8). The corresponding q-q plot of the residuals with respect to a fitted normal distribution is presented in FIG. 12B. In this case, the $R^2$ value of the ordinary least squares fit was 0.77.

Figure 13A:
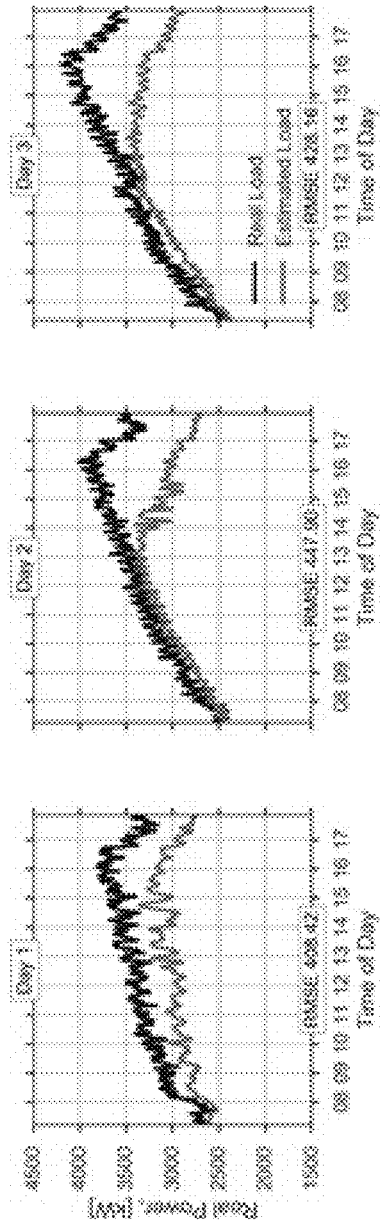
FIG. 13A shows an example of measurements of load estimated using a linear estimator equation.
Figure 13B:
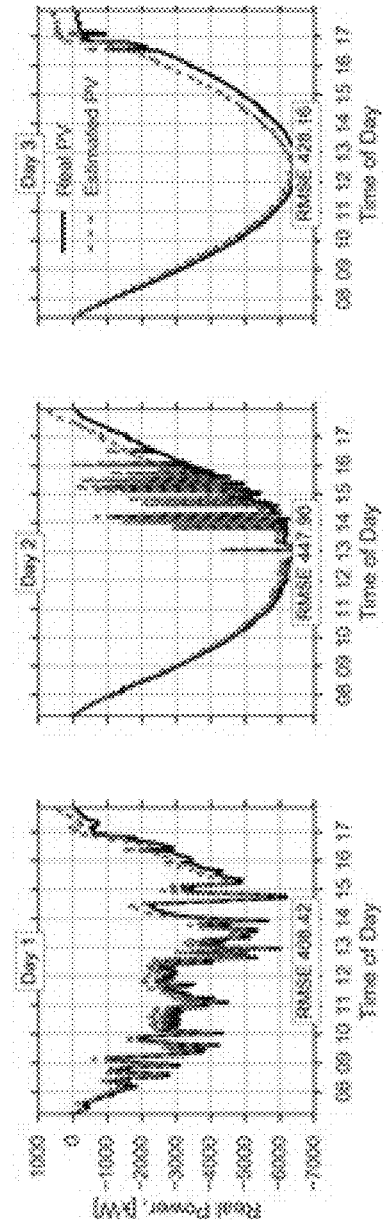
FIG. 13B shows an example of measurements of photovoltaic generation estimated using a linear estimator equation.

Using the described set of equations in (9), one can predict $\hat{P}_{Load}^T$ and $\hat{P}_{PV}^T$. The resulting $\hat{P}_{Load}^T$ and $\hat{P}_{PV}^T$ as well as corresponding root mean squared error (RMSE) values between the estimated and measured load and generation are presented in FIGS. 13A-13B, respectively. Since we estimate the solar generation based on predictions of load in equation (9), the RMSE values for both load and solar estimations are identical for all days. In FIG. 13B, it is possible to see that the linear estimator does a good job estimating the solar generation in the system.

In the following section, we employ contextually supervised source separation to distribute the overall error term, $\in_{Total}$, into both the load and PV error terms, rather than assigning them entirely to PV.

6. Contextually Supervised Generation Estimation

To expand the described linear regression setting, we explicitly represent reconstructed signals and capture the errors systematically by using contextually supervised source separation. In its general form, contextually supervised source separation is introduced in [6] as a single-channel source separation methodology. As opposed to supervised settings that require true signal separations [21], and unsupervised settings [22] which results in arbitrarily many solutions, it leverages contextual supervision to disaggregate the source signal into correlated component signals. In [6], the authors apply this methodology to the energy disaggregation problem.

For L many unknown signals that are of interest, we assume that we observe the aggregate signal, $Y_{agg}$ such that $$Y_{agg} = \Sigma_{i=1}^L Y_i \quad (11)$$

where $Y_i$ represents an individual unknown signal. Assuming we can represent the individual load with a linear model (i.e. $Y_i X_i \Theta_i$), we introduce the general contextually supervised learning problem as follows:

$$\underset{Y_i, \Theta_i}{\text{minimize}} \{\alpha_i l_i((Y_i - X_i \Theta_i) + \eta_i g_i(Y_i) + \gamma_i h_i(\Theta_i)\}$$

$$\text{subject to } Y_{agg} = \sum_{i=0}^L Y_i$$

where $Y_i$ represents a function that penalizes the difference between the reconstructed signal and the corresponding linear model. In [6], the authors discuss the differences between using l-1 and l-2 norms specifically. The function g represents a penalty function that captures additional contextual information on individual signals, such as smoothness. Finally, the function h represents a regularization term on the model parameters to prevent overfitting.

The authors also discuss the special case in which only '$_i$ function is used in the objective function as an l-2 norm. This reduces the described methodology to an ordinary linear regression in which the $Y_{agg}$ term is regressed by the $\Theta_i$ parameters.

In the next section, we formulate the solar disaggregation problem at hand as a contextually supervised source separation problem.

6.1. Problem Formulation

Assuming proxy solar irradiance and substation μPMU measurements are available to the estimator for a time period T, we cast the case-specific disaggregation problem as the following optimization:

$$\underset{P_{Load},P_{PV},k_{eff},C_{eff}}{\text{minimize}} \quad (12)$$

$$\{\alpha l_1((P_{Load}^T - k_{eff}Q_{PMU1}^T) + \beta l_2(P_{PV}^T - C_{eff}\phi^T) + g_1(P^t) +$$

$$g_2(P_{Load}^T) + h_1(C_{eff}) + h_2(k_{eff}))\}$$

subject to $P_{PMU1}^T = P_{Load}^T + P_{PV}^T$ where we represent the load $P_{Load}^T$ as a linear function of reactive power measured at the PMU $Q_{PMU1}^T$, and the PV generation $P_{PV}^T$ as a linear function of a solar irradiance proxy measurement $\varphi^T$. Similar to the LE, we refer to the reactive power coefficient as the effective power factor $K_{eff}$ and the solar irradiance proxy measurement coefficient as the effective solar capacity $C_{eff}$. The $\alpha$ and $\beta$ parameters are weighting factors. The loss functions are penalizing the differences between the reconstructed solar generation and load, and their linear representation is modeled using $\varphi^T$ and $Q_{PMU}^t$, respectively.

The problem presented in equation (12) is the main disaggregation problem addressed in this section. First, we will introduce a specific case where we only use '$_l$' terms and each of these terms is assumed to be $2^{nd}$ norm. Formally, we are interested in the following problem:

$$\underset{Y_i,\Theta_i}{\text{minimize}} \{\alpha_i l_i((Y_i - X_i\Theta_i) + \eta_i g_i(Y_i) + \gamma_i h_i(\Theta_i))\} \quad (13)$$

subject to $Y_{agg} = \Sigma_{i=0}^L Y_i$

In [6], the authors show that the specific case presented in equation (13), and the multiple linear regression strategy presented in equation (8) results in the identical model parameters $C_{eff}$, $k_{eff}$ and R for all cases where $\alpha=\beta$. In Appendix A.2 we show that this is true for any non-zero $\alpha$ and $\beta$ values.

As discussed in Section 5, each component of the described linear models has its own error term, and we cannot expect to recover the true $P_{Load}$ and $P_{PV}$. We can only obtain the truthful values for $C_{eff}$ and $k_{eff}$ under an ordinary least squares (OLS) setting. However, our main focus is to obtain accurate reconstructed signals $P_{Load}$ and $P_{PV}$.

Unlike the LE, instead of making an assumption on the magnitude of the errors for each model, we describe estimating weights multiplying these error values—$\alpha$ and $\beta$—exogenously from day and night observations. Specifically, we only assume that the individual errors are Gaussian and independent and identically distributed (i.i.d.). We refer to the error term of the linear model of load as $\in_{load}$ and of PV as $\in_{PV}$. The following holds for the aggregate error, given that $\in_{load}$ and $\in_{PV}$ are i.i.d:

$$\text{Var}(\in_{Total}) \approx \text{Var}(\in_{PV}) + \text{Var}(\in_{Load}) \quad (14)$$

To estimate $\text{Var}(\in_{Load})$, we leverage night-time measurements, when solar generation is not available. Specifically, we describe estimating the variance of the error term $\in_{Load}$ using the following linear model:

$$P_{Load}^T k_{eff}Q_{PMU1}^T + R + \in_{load} \quad (15)$$

To obtain the variance, one can use measurements obtained from $\mu PMU_2$ similar to equation (15). We refer to this variance as $\text{Var}(\in_{*PV})$. However, since in reality we would not have measurements obtained from $\mu PMU_2$, we describe use of the property given in equation (14) to estimate the variance of PV. Specifically, we first calculate $\text{Var}(\in_{PMU\ 1})$ during insolation periods. Then, assuming the night-time $\text{Var}(\in_{Load})$ is representative of the daily variance in the load, we calculate the variance in PV. Formally, to estimate $\text{Var}(\in_{*PV})$, we will use the following linear model:

$$P_{PV}^T = C_{eff}\phi^T + \in_{*P_v} \quad (16)$$

Similarly, to estimate $\text{Var}(\in_{PV})$, we will first obtain Var $(\in_{*Total})$ using the following model used in LE:

$$P_{PMU1}^T = k_{eff}Q_{PMU\ 1}^T + R + C_{eff}\phi^T + \in_{Total} \quad (17)$$

We can then use the property introduced in equation (14) to estimate $\text{Var}(\in_{*PV})$ Following the estimation of $\text{Var}(\in_{*PV})$ and $\text{Var}(\in_{*Load})$, we define $\alpha^*$ and $\beta^*$ as follows:

$$\alpha^* = \frac{1}{Var(\in_{*Load})} \quad \beta^* = \frac{1}{Var(\in_{*PV})} \quad (18)$$

The motivation behind the above equation is intuitive: in order to distribute the error relative to the goodness of each model (i.e. to minimize the variance of the weighted average), we multiply the expected error in the objective function by the inverse of its variance.

Figure 14A:
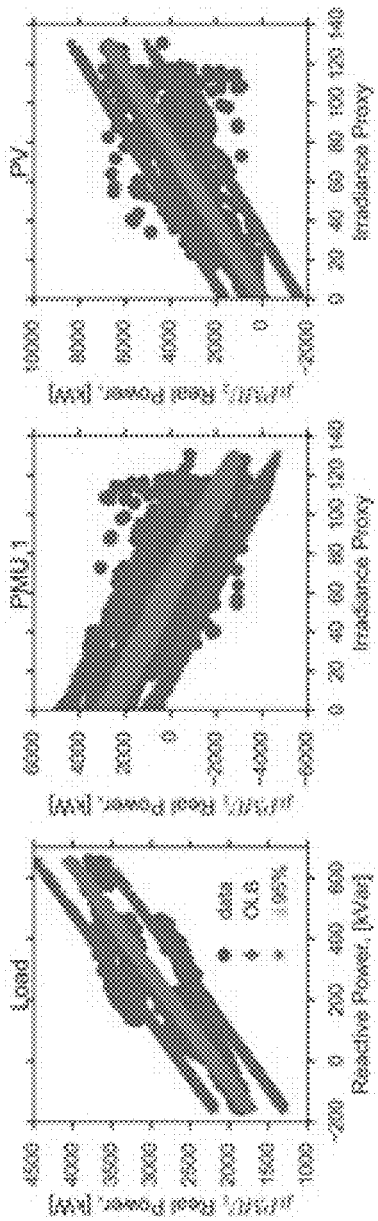
FIG. 14A shows an example of models used to estimate α* and β*.
Figure 14B:
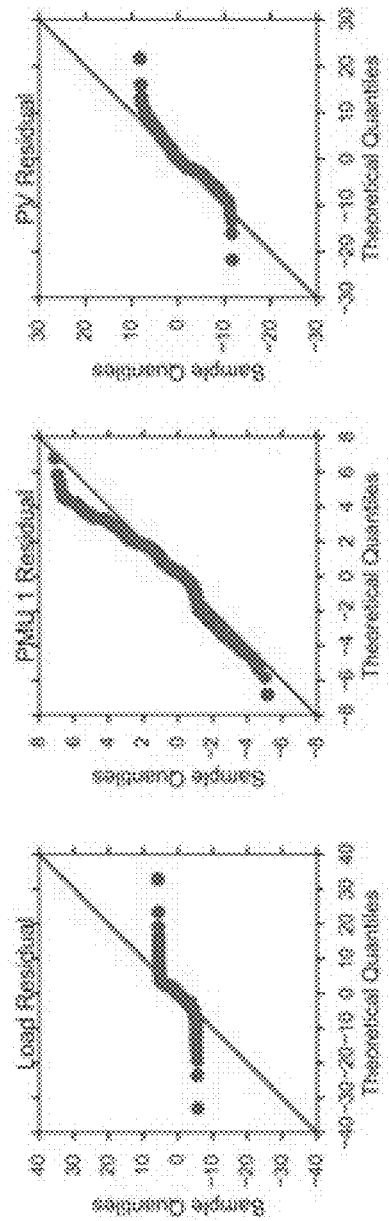
FIG. 14B shows an example of models used to estimate α* and β*.

FIGS. 14A and 14B show the resulting models used to estimate $\text{Var}(\in^*_{Load})$ and $\text{Var}(\in^*_{PV})$. FIG. 14A shows the data used in fitting the models, the resulting fit and 95% confidence intervals for all three models introduced in equations (15), (16), and (17). Specifically, the left plot shows the model obtained by regressing the active load in the system using reactive power overnight as given in equation (15). The middle plot shows the aggregate model as given in equation (17) with respect to solar irradiance. The right plot shows the linear PV model introduced in equation (16). Note that in this disclosure, we did not use this linear model since measurements from $\mu PMU_2$ are not available to the estimator. We show these results for demonstration purposes. Similar to FIG. 14A, FIG. 14B shows the corresponding q-q plots for each model.

Figure 15A:
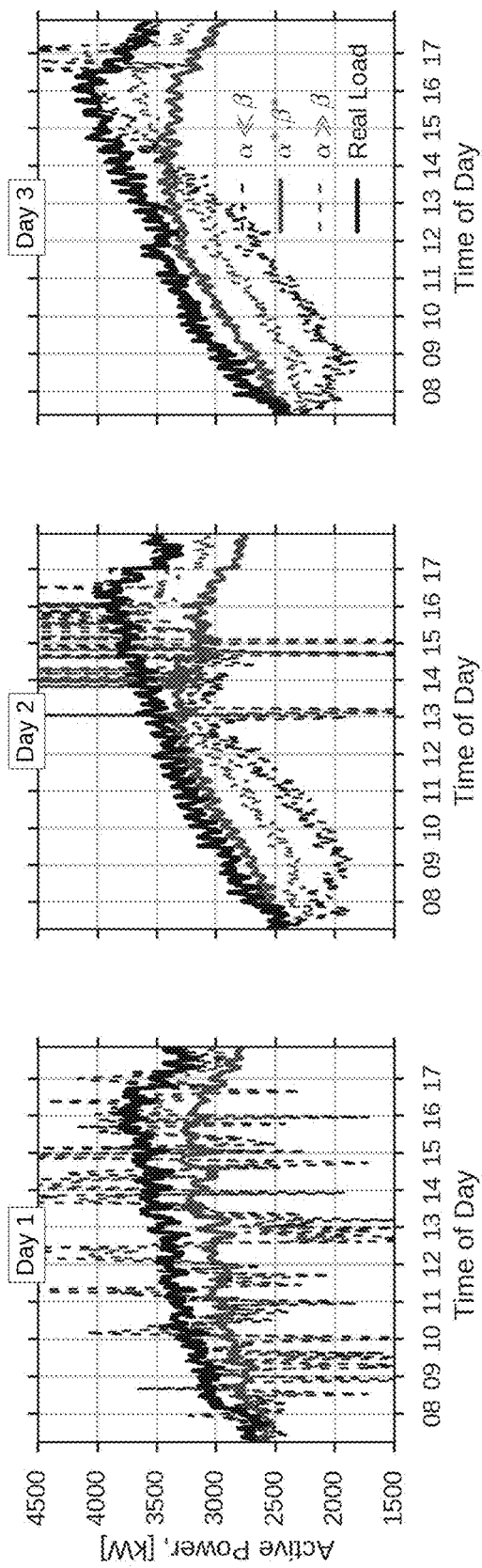
FIG. 15A shows an example of measurements of load estimated using a contextually supervised strategy.
Figure 15B:
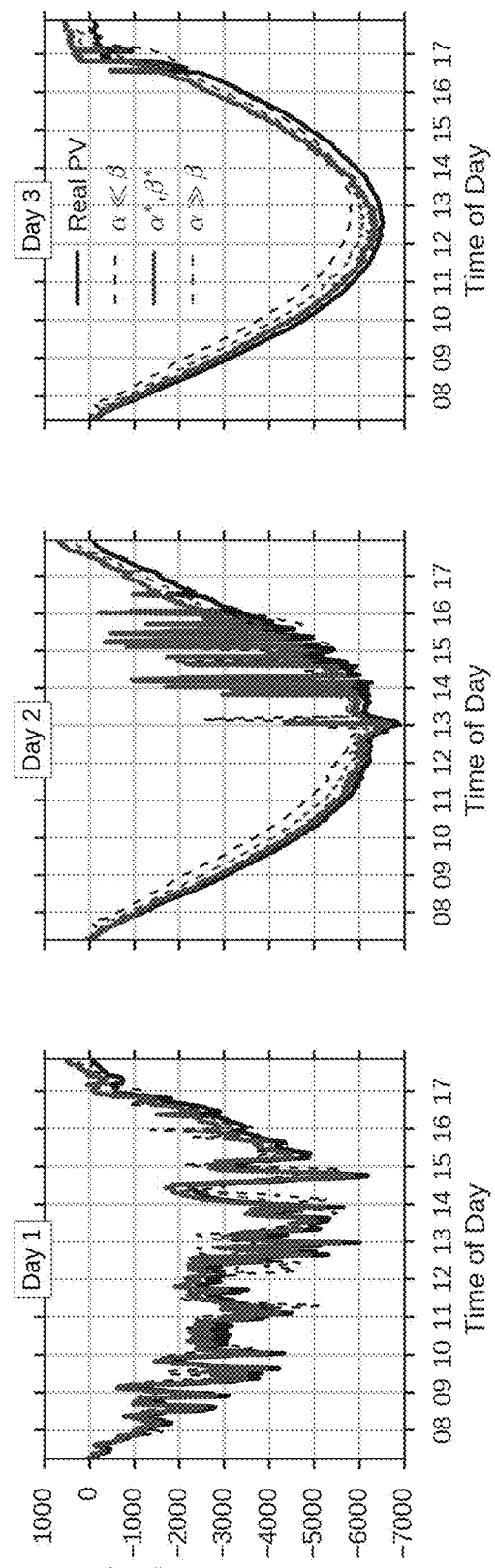
FIG. 15B shows an example of measurements of photovoltaic generation estimated using a contextually supervised strategy.
Figure 16:
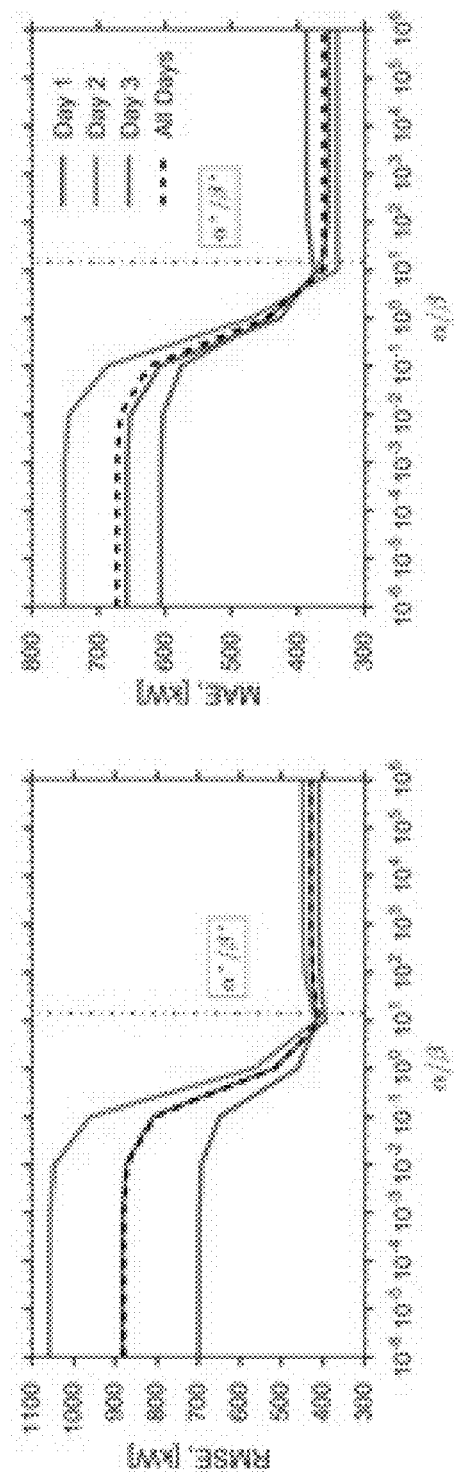
FIG. 16 shows examples of the sensitivity of disaggregation accuracy to α/β.

FIGS. 15A and 15B present the disaggregation results for load and PV, respectively. Specifically, we present results for three different cases $\alpha^*/\beta^*$, $\alpha<<\beta$ and $\alpha>>\beta$. For Day 1 and Day 2, it is possible to see that when $\alpha<<\beta$, the reconstructed load signal shows a very noisy behavior. This is because decreasing $\alpha$ and increasing $\beta$ allows us to enforce the solar representation to be as close as possible to the proxy measurement $\varphi^T$. In other words, we significantly increase the weighting factor of the deviation of the reconstructed solar generation signal from the linear model that is representing it. This is especially clear for Hour 13 of Day 2 results.

The opposite is true for $\alpha>>\beta$. In fact, we should expect the results of $\alpha>>\beta$ to be very close to the LE. This is because in LE, we made the assumption that the error in the linear model of the load is negligible in comparison to the error in the PV model.

Figure 17:
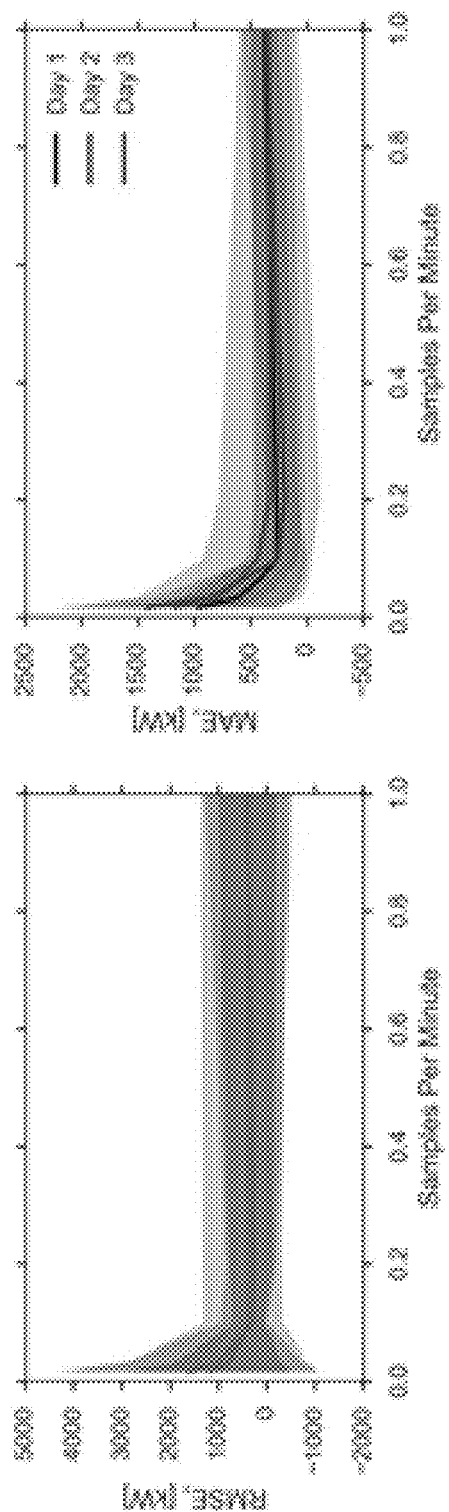
FIG. 17 shows examples of the sensitivity of disaggregation accuracy to sampling rate.

To further demonstrate the role of $\alpha$ and $\beta$ in disaggregation performance, we evaluate the disaggregation accuracy for $P_{Load}^T$ and $P_{PV}^T$ for a set of $\alpha/\beta$ parameters, including $\alpha^*/\beta^*$. FIG. 17 shows the sensitivity of disaggregation accuracy measured by mean absolute error (MAE) and RMSE, respectively. Note that for both MAE and RMSE, for $\alpha/\beta$ values less than the estimated $\alpha^*/\beta^*$ the disaggregation performance improves significantly. For values of $\alpha/\beta$ higher than $\alpha^*/\beta^*$ the disaggregation performance remains the same. This is consistent with our findings in LE. We can conclude that the assumptions on errors made in LE are almost correct. That is, given the size of the PV system studied here, and the generally high variability of PV generation compared to load, our results suggest that $\mathring{A}_{Load} \ll \mathring{A}_{PV}$.

We also should note that the contextually supervised generation estimation results in a slightly lower reconstructed signal RMSE in comparison to LE, and it also provides us with a strategic way to manage the errors between the linear representations of each signal and their reconstruction.

Having 1-minute sampling rate for both proxy irradiance measurements and the substation measurements make it possible to study the errors of the described methodology with respect to a wide range of measurement sampling rate. Although currently most smart meters only transfer energy measurements, they can be used to obtain reactive power measurements as well [23]. These measurements can be aggregated at the substation level to be used in generation disaggregation as described in this disclosure. Furthermore, steady state SCADA units provide reactive power measurements at a 15-minute sampling rate. Hence we describe downsampling the inputs to the estimation strategy to evaluate how accurate 1-minute PV generation disaggregation results would be using input data with lower sampling rates.

To do that, we create input signals by padding the latest measurement to do 1-minute disaggregation. We then estimate the $\alpha^*$ and $\beta^*$ values for each sampling rate. We use the contextually supervised generation estimation method to obtain reconstructed signals. We then report average RMSE and MAE values as well as $\pm 2\sigma$ ranges around these errors.

FIG. 17 shows the results. Notice that up to 0.2 samples per minute (i.e. 5 minute sampling rate), we observe significant improvement in both average MAE and RMSE, and the variance terms. After 0.2 samples per minute there is no improvement in the RMSE and MAE values. This might be due to low-pass filter (i.e. 5 minute rolling mean) applied to the solar data. The added benefit of 1-minute reactive power measurements as opposed to 5-minute does not seem to improve the overall performance of the described contextually supervised disaggregation methodology when a 5 minute rolling mean filter is applied. A detailed analysis of varying input data granularity and filtering is left for future work.

7. Conclusions

A set of methods to disaggregate PV active power generation from active power consumption measured at a distribution substation was tested. We first described a power factor based estimator (PFBE), in which we estimated the load's power factor using night-time measurements, when PV generation was not generating, and we assumed that PV's power factor is −1. Although, the PFBE is computationally inexpensive, its assumptions greatly limited its ability to disaggregate PV. Specifically, constant load power factor assumption was limiting, and reactive power consumption of the PV plant was not zero. In fact, at times, reactive power consumption of the PV plant exceeded 25% of load's reactive power consumption. This resulted in a significant overestimation of active power consumption and, correspondingly, PV generation in the system.

In order to relax some of the assumptions made in the PFBE, we introduced the linear estimator. The linear estimator predicts load using reactive power and a constant term, and predicts PV generation using observed generation from a nearby PV system. We fitted coefficients to each model by adding them together and minimizing the square errors in their prediction of total active power measured at the substation. Using the estimated linear models, and an assumption that errors in load's predictions are much less than errors in PV generation predictions, $\in_{Load} \ll \in_{PV}$, we reconstructed the PV generation signal for 3 days. We observed a significant improvement in performance, however, our assumption on the errors is limiting. In particular, it does not reflect the expected performance of each model. Rather, it assumes an accurate load model and associates all the errors with the PV model. Thus, it limits our ability to tune the disaggregation based on the expected performance of each model.

To better distribute the errors from the aggregate model estimated by LE to the individual models, we described using contextually supervised generation separation, CSGE [6]. We extended Wytock and Kolter's original analysis to show that, for the special case '−2 norm objective functions used here, the optimal solution for model coefficients are the same as those found by the LE, regardless of how each model's prediction errors are weighted in the objective function. We then described estimating optimal weights for the CSGE objective function by comparing the variance of the linear model's predictions during daytime hours versus nighttime hours. The variance of the aggregate model's errors during nighttime hours reflects only load predictions; while the variance during daytime hours contains errors from both the PV and load predictions. Assuming that the errors from each model are independent, we used this information to estimate variances for prediction errors from load and PV models separately. We then defined weights for the CSGE objective function, $\alpha^*$ and $\beta^*$, to be proportional to the inverse of the expected variance of errors from each model. Our sensitivity results suggest that we reached an optimal disaggregation performance by using values of $\alpha^*$ and $\beta^*$ learned from the variances.

Finally, we studied the change in performance of the model when measurements are recorded at frequencies slower than the current sampling rate of once per minute. We observed that the performance of the CSGE improves drastically until 0.2 samples per minute. However, we did not see a significant improvement in the performance frequencies faster than 0.2 samples per minute.

REFERENCES

The following references are incorporated herein by reference for their teaching relating to the context in which they are referenced in the example above.

[1] D. Macii, G. Barchi, and D. Moser, "Impact of pmus on state estimation accuracy in active distribution grids with large pv penetration," in *Environmental, Energy and Structural Monitoring Systems (EESMS), 2015 IEEE Workshop on*, pp. 72-77, IEEE, 2015.

[2] A. von Meier, D. Culler, A. McEachern, and R. Arghandeh, "Microsynchrophasors for distribution systems," in *IEEE 5th Innovative Smart Grid Technologies Conference, Washington, D.C.*, 2014.

[3] J. Sexauer, P. Javanbakht, and S. Mohagheghi, "Phasor measurement units for the distribution grid: Necessity and benefits," in *Innovative Smart Grid Technologies (ISGT), 2013 IEEE PES*, pp. 1-6, IEEE, 2013.

[4] "μpmu information." http://www.powersensorsltd.com/PQube3.php. Accessed: 2016 Jan. 15.

[5] J. H. Eto, E. M. Stewart, T. Smith, M. Buckner, H. Kirkham, F. Tuffner, and D. Schoenwald, "Scoping study on research and priorities for distribution-system phasor measurement units," 12/2015 2015.

[6] M. Wytock and J. Z. Kolter, "Contextually supervised source separation with application to energy disaggregation," arXiv preprint arXiv:1312.5023, 2013.

[7] C. A. Gueymard, "Direct and indirect uncertainties in the prediction of tilted irradiance for solar engineering applications," *Solar Energy*, vol. 83, no. 3, pp. 432-444, 2009.

[8] C. A. Gueymard, "Progress in direct irradiance modeling and validation," in *Solar 2010 Conf., Phoenix, Ariz., American Solar Energy Soc*, 2010.

[9] J. Alonso-Montesinos, F. Batlles, and J. Bosch, "Beam, diffuse and global solar irradiance estimation with satellite imagery," *Energy Conversion and Management*, vol. 105, pp. 1205-1212, 2015.

[10] M. Jamaly, J. L. Bosch, and J. Kleissl, "Aggregate ramp rates of distributed photovoltaic systems in san diego county," *Sustainable Energy, IEEE Transactions on*, vol. 4, no. 2, pp. 519-526, 2013.

[11] F. A. Mejia and J. Kleissl, "Soiling losses for solar photovoltaic systems in california," *Solar Energy*, vol. 95, pp. 357-363, 2013.

[12] D. C. Jordan and S. R. Kurtz, "Photovoltaic degradation rates—an analytical review," *Progress in photovoltaics: Research and Applications*, vol. 21, no. 1, pp. 12-29, 2013.

[13] T. Z., A.-H. H., C. E., A. L., U. S., B. M., and M.-R. H., "Batteryassisted distribution feeder peak load reduction: Stochastic optimization and utility-scale implementation," in *Power & Energy Society General Meeting, 2016 IEEE, IEEE*, 2016.

[14] R. Haaren, M. Morjaria, and V. Fthenakis, "Empirical assessment of shortterm variability from utility-scale solar pv plants," *Progress in Photovoltaics: Research and Applications*, vol. 22, no. 5, pp. 548-559, 2014.

[15] A. Mills and R. Wiser, "Implications of Wide-Area Geographic Diversity for Short-Term Variability of Solar Power," tech. rep., Lawrence Berkeley National Labratory, 2010.

[16] R. Perez, S. Kivalov, J. Schlemmer, K. Hemker Jr., and T. E. Hoff, "Shortterm irradiance variability: Preliminary estimation of station pair correlation as a function of distance," *Solar Energy*, vol. 86, pp. 2170-2176, August 2012.

[17] M. D. Tabone and D. S. Callaway, "Parameterizing Fluctuations in Solar Photovoltaic Generation Using Hidden Markov Models," in *Proceedings of the 2013 IEEE Power & Energy Society General Meeting*, (Vancouver, BC), July 2013.

[18] M. Berges, E. Goldman, H. S. Matthews, L. Soibelman, and K. Anderson, "User-centered nonintrusive electricity load monitoring for residential buildings," *Journal of computing in civil engineering*, vol. 25, no. 6, pp. 471-480, 2011.

[19] A. Cagnano, E. De Tuglie, M. Liserre, R. Mastromauro, et al., "Online optimal reactive power control strategy of pv inverters," *Industrial Electronics, IEEE Transactions on*, vol. 58, no. 10, pp. 4549-4558, 2011.

[20] D. B. Arnold, M. Negrete-Pincetic, E. M. Stewart, D. M. Auslander, and D. S. Callaway, "Extremum seeking control of smart inverters for var compensation," in *Power & Energy Society General Meeting, 2015 IEEE*, pp. 1-5, IEEE, 2015.

[21] J. Z. Kolter, S. Batra, and A. Y. Ng, "Energy disaggregation via discriminative sparse coding," in *Advances in Neural Information Processing Systems*, pp. 1153-1161, 2010.

[22] H. Kim, M. Marwah, M. F. Arlitt, G. Lyon, and J. Han, "Unsupervised disaggregation of low frequency power measurements.," in *SDM*, vol. 11, pp. 747-758, SIAM, 2011.

[23] K. Turitsyn, S. Backhaus, M. Chertkov, et al., "Options for control of reactive power by distributed photovoltaic generators," *Proceedings of the IEEE*, vol. 99, no. 6, pp. 1063-1073, 2011.

What is claimed is:

1. A method comprising:
    calculating, using a device, aggregate active power associated with a distribution substation based on a sample of voltage phasor measurements and current phasor measurements;
    calculating, using the device, aggregate reactive power associated with the distribution substation based on the sample of voltage phasor measurements and current phasor measurements;
    generating an estimated power factor representing an average value of an effective relationship between the aggregate active power and the aggregate reactive power;
    determining an active power load value at the distribution substation based on the estimated power factor, the aggregate reactive power, and an average reactive power load of the distribution substation, the average reactive power load being independent of the aggregate reactive power;
    determining an active power photovoltaic (PV) value from one or more PV sites connected with the distribution substation based on a difference between the aggregate active power and the active power load value;
    identifying a PV irradiance proxy measurement corresponding with active power being generated by a proxy PV site proximate with the distribution substation;
    identifying an effective PV capacity of the proxy PV site;
    identifying a load variance associated with the active power load value measured during a period of non-insolation;
    identifying an aggregate variance associated with the distribution substation during a period of insolation;
    determining, based on a difference between the aggregate variance and the load variance, a PV variance associated with the active power PV value;
    generating a disaggregated active power PV value for the one or more PV sites by modifying the active power PV value according to the PV irradiance proxy measurement, the effective PV capacity of the proxy PV site, and the PV variance, the disaggregated active power PV value representing an estimated value with a root-mean-square error (RMSE) accuracy of less than 10%;
    detecting a switching event; and
    compensating for the detected switching event in load power factor measurements.

2. The method of claim 1, further comprising:
    determining an estimated state for a distribution power system using the active power load value and the active power PV value, the estimated state representing detailed status information concerning the distribution power system; and
    causing display of the estimated state at a user interface of a display device.

3. The method of claim 1, wherein the aggregate reactive power includes reactive power from a plurality of smart meters connected with the distribution substation.

4. The method of claim 1, wherein the load variance is weighted according to a first weight variance representing an inverse of the load variance, and wherein the PV variance is weighted according to a second weight variance representing an inverse of the PV variance.

5. A method comprising:
identifying, using a device, aggregate active power associated with a distribution substation;
identifying, using the device, aggregate reactive power associated with the distribution substation;
generating an estimated power factor representing an average value of an effective relationship between the aggregate active power associated with the distribution substation and the aggregate reactive power associated with the distribution substation;
determining active power load at the distribution substation based on the estimated power factor and the aggregate reactive power associated with the distribution substation; and
determining active power generated by one or more renewable energy sites connected with the distribution substation based on a difference between the aggregate active power and the active power load;
detecting a switching event; and
compensating for the detected switching event in load power factor measurements.

6. The method of claim 5, the method further comprising:
determining an estimated state for a distribution power system using the active power load and the active power generated by one or more renewable energy sites, the estimated state representing detailed status information concerning the distribution power system; and
causing display of the estimated state at a user interface of a display device.

7. The method of claim 5, wherein the aggregate reactive power includes reactive power from a plurality of smart meters connected with the distribution substation.

8. The method of claim 5, wherein determining the active power generated by one or more renewable energy sites includes:
identifying a photovoltaic (PV) irradiance proxy measurement;
identifying an effective PV capacity associated with the PV irradiance proxy measurement; and
generating a modified value corresponding with the active power generated by one or more renewable energy sites in comparison with the PV irradiance proxy measurement and the effective PV capacity.

9. The method of claim 8, wherein the PV irradiance proxy measurement includes one or more of: active power generated by a proxy PV site proximate with the distribution substation, a clear sky irradiance model, a weather station proximate with the distribution substation, one or more satellite irradiance measurements, or one or more ground irradiance measurements.

10. The method of claim 8, wherein the modified value corresponding with the active power generated by one or more renewable energy sites is generated by:
identifying a load variance associated with the active power load measured during a period of non-insolation, wherein the load variance is weighted according to a first weight variance representing an inverse of the load variance;
identifying an aggregate variance associated with the distribution substation during a period of insolation; and
determining, based on a difference between the aggregate variance and the load variance, a renewable energy variance associated with the active power generated by the one or more renewable energy sites, wherein the renewable energy variance is weighted according to a second weight variance representing an inverse of the renewable energy variance.

11. The method of claim 5, wherein the active power generated by one or more renewable energy sites represents an estimated value with a RMSE accuracy of less than 10%.

12. The method of claim 5, wherein the one or more renewable energy sites include one or more of: a PV site, a hydroelectric site, a wind power site, or a geothermal site.

13. A system comprising:
one or more processors and memory configured to:
identify, using a device, aggregate active power associated with a distribution substation;
identify, using the device, aggregate reactive power associated with the distribution substation;
generate an estimated power factor representing an average value of an effective relationship between the aggregate active power associated with the distribution substation and the aggregate reactive power associated with the distribution substation;
determine active power load at the distribution substation based on the estimated power factor and the aggregate reactive power associated with the distribution substation; and
determine active power generated by one or more renewable energy sites connected with the distribution substation based on a difference between the aggregate active power and the active power load;
detecting a switching event; and
compensating for the detected switching event in load power factor measurements.

14. The system of claim 13, wherein the one or more processors and memory are configured to:
determine an estimated state for a distribution power system using the active power load and the active power generated by one or more renewable energy sites, the estimated state representing detailed status information concerning the distribution power system; and
cause display of the estimated state at a user interface of a display device.

15. The system of claim 13, wherein the aggregate reactive power includes reactive power from a plurality of smart meters connected with the distribution substation.

16. The system of claim 13, wherein the one or more processors and memory are configured to:
identify a photovoltaic (PV) irradiance proxy measurement;
identify an effective PV capacity associated with the PV irradiance proxy measurement; and
generate a modified value corresponding with the active power generated by one or more renewable energy sites in comparison with the PV irradiance proxy measurement and the effective PV capacity.

17. The system of claim 16, wherein the PV irradiance proxy measurement includes one or more of: active power generated by a proxy PV site proximate with the distribution substation, a clear sky irradiance model, a weather station proximate with the distribution substation, one or more satellite irradiance measurements, or one or more ground irradiance measurements.

18. The system of claim 16, wherein the one or more processors and memory are configured to:

identify a load variance associated with the active power load during a period of non-insolation, wherein the load variance is weighted according to a first weight variance representing an inverse of the load variance;

identify an aggregate variance associated with the distribution substation during a period of insolation; and determine, based on a difference between the aggregate variance and the load variance, a renewable energy variance associated with the active power generated by the one or more renewable energy sites, wherein the renewable energy variance is weighted according to a second weight variance representing an inverse of the renewable energy variance.

19. The system of claim 18, wherein the active power generated by one or more renewable energy sites represents an estimated value with a RMSE accuracy of less than 10%.

20. The system of claim 13, wherein the one or more renewable energy sites include one or more of: a PV site, a hydroelectric site, a wind power site, or a geothermal site.

* * * * *